(12) United States Patent
Marcellino et al.

(10) Patent No.: US 8,396,463 B2
(45) Date of Patent: Mar. 12, 2013

(54) MANAGING NOTIFICATION SERVICE CONNECTIONS AND DISPLAYING ICON BADGES

(75) Inventors: Chris Marcellino, San Francisco, CA (US); Justin Santamaria, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/416,295

(22) Filed: Mar. 9, 2012

(65) Prior Publication Data

US 2012/0173645 A1 Jul. 5, 2012

Related U.S. Application Data

(60) Division of application No. 12/433,709, filed on Apr. 30, 2009, now Pat. No. 8,135,392, which is a continuation-in-part of application No. 12/198,037, filed on Aug. 25, 2008.

(60) Provisional application No. 61/059,703, filed on Jun. 6, 2008.

(51) Int. Cl.
H04M 3/00 (2006.01)

(52) U.S. Cl. ............... 455/418; 455/550.1; 455/403; 709/206

(58) Field of Classification Search .............. 455/418, 455/550.1, 403; 709/206
See application file for complete search history.

(56) References Cited

U.S. PATENT DOCUMENTS

| | | | |
|---|---|---|---|
| 5,410,543 A | 4/1995 | Seitz et al. | |
| 6,208,996 B1 | 3/2001 | Ben-Shachar et al. | |
| 6,223,046 B1 | 4/2001 | Hamill-Keays et al. | |
| 6,546,425 B1 | 4/2003 | Hanson et al. | |
| 6,579,378 B1 | 6/2003 | Aghajanian | |
| 6,650,621 B1 | 11/2003 | Maki-Kullas | |
| 6,687,608 B2 * | 2/2004 | Sugimoto et al. | 701/468 |
| 7,313,419 B2 | 12/2007 | Islam et al. | |
| 7,487,248 B2 | 2/2009 | Moran et al. | |
| 7,522,911 B2 | 4/2009 | Ung et al. | |
| 7,895,309 B2 | 2/2011 | Belali et al. | |
| 8,165,773 B1 * | 4/2012 | Chavez et al. | 701/93 |
| 2002/0147660 A1 | 10/2002 | Indence | |
| 2003/0078076 A1 | 4/2003 | Kuwajima et al. | |
| 2003/0149737 A1 * | 8/2003 | Lambert et al. | 709/214 |
| 2004/0258072 A1 | 12/2004 | Deforche | |
| 2005/0063330 A1 * | 3/2005 | Lee et al. | 370/328 |
| 2005/0246343 A1 * | 11/2005 | Burns et al. | 707/10 |
| 2006/0106806 A1 | 5/2006 | Sperling et al. | |
| 2006/0123428 A1 * | 6/2006 | Burns | 719/318 |
| 2006/0252530 A1 | 11/2006 | Oberberger et al. | |
| 2007/0050812 A1 | 3/2007 | Ebata et al. | |
| 2007/0106739 A1 | 5/2007 | Clark et al. | |
| 2007/0223408 A1 | 9/2007 | Thielke et al. | |
| 2007/0232366 A1 * | 10/2007 | Chen et al. | 455/574 |
| 2007/0249470 A1 | 10/2007 | Niva et al. | |
| 2007/0264948 A1 | 11/2007 | Jansson et al. | |
| 2008/0119209 A1 | 5/2008 | Upp | |

(Continued)

OTHER PUBLICATIONS

David Chartier, "Lots to Like About New iPhone 2.2 Software Update (Updated)", Nov. 21, 2008, 3 pages.

*Primary Examiner* — Danh Le

(74) *Attorney, Agent, or Firm* — Park, Vaughan, Fleming & Dowler LLP

(57) ABSTRACT

A method and apparatus to manage notification service connections. In one embodiment of the invention, a mobile device schedules a notification service connection message transmission interval for each of a plurality of notification service connections. The mobile device also associates a notification service connection message transmission window with each notification service connection message transmission interval. The mobile device synchronizes transmission of notification service connection messages based on overlapping notification service connection message transmission windows. Responsive to receiving a notification message on one of the notification service connections, an icon badge is displayed on the mobile device for the appropriate application.

30 Claims, 15 Drawing Sheets

U.S. PATENT DOCUMENTS

| | | |
|---|---|---|
| 2008/0247348 A1 | 10/2008 | Wilson et al. |
| 2008/0256203 A1 | 10/2008 | Gorty et al. |
| 2009/0191824 A1* | 7/2009 | Williams et al. .............. 455/100 |
| 2009/0219915 A1* | 9/2009 | Orcutt et al. .................. 370/347 |
| 2009/0228566 A1* | 9/2009 | Sharp et al. ................... 709/207 |
| 2009/0305732 A1 | 12/2009 | Marcellino et al. |
| 2010/0030612 A1 | 2/2010 | Kim et al. |

* cited by examiner

MANAGING NOTIFICATION SERVICE CONNECTIONS AND DISPLAYING ICON BADGES

CROSS-REFERENCE TO RELATED APPLICATIONS

This application is a divisional of U.S. application Ser. No. 12/433,709, filed Apr. 30, 2009 now U.S. Pat. No. 8,135,392, which is a continuation-in-part of U.S. application Ser. No. 12/198,037, filed Aug. 25, 2008, which claims the benefit of U.S. Provisional Application No. 61/059,703, filed Jun. 6, 2008, which are each hereby incorporated by reference in their entireties.

This application is related to co-pending U.S. patent application Ser. No. 12/042,307, entitled "Automatic Notification System and Process" filed on Mar. 4, 2008.

BACKGROUND

1. Field

Embodiments of the invention relate to the field of mobile device processing; and more specifically, to managing notification service connections of mobile devices and displaying icon badges.

2. Background

Users of a mobile device (e.g., laptop, palmtop, portable media player, smartphone, multimedia mobile phone, mobile gaming systems such as a "Gameboy", etc.) may subscribe to one or more notification services that may periodically send notification messages to the mobile device. For example, users may subscribe to one or more "push" email services (e.g., MobileMe, Microsoft Exchange ActiveSync, push-IMAP, Yahoo! Push, etc.) or other push services (e.g., update/upgrade services, news services, weblog services, podcast services, social networking services, or other types of services that send notification messages to the mobile devices). Notification messages typically represent events of interest which are typically defined by the applications (e.g., new email indicator, new news item indicator, new podcast indicator, change of online status of a social networking friend, etc.).

In the case of a push email service, for example, the email server may automatically transmit email messages and/or calendar updates to the email client on the mobile device for the user without the user requesting the item. In other words, the user does not request (poll) the email server for email messages or other items of interest. Thus, a push notification service is a persistent notification service. In order to maintain a push notification service, the mobile device periodically refreshes the connection to the push notification service (e.g., by transmitting a ping message to the push server).

In addition, users may subscribe to one or more "pull" services, such as "pull" email services (e.g., IMAP, POP3). In a pull email service, a user periodically checks (polls) the email server to determine if there is new email messages. If there are new email messages, they are then downloaded to the client. Many email clients support an automatic configuration of a poll interval. For example, a user of the mobile device may configure a poll interval of 10 minutes for a POP3 email account (thus the email client automatically polls the email server every 10 minutes to check for new email messages). In addition, notification services may be configured to provide network wide (e.g., Internet wide) event notification messages to multiple subscribers, where notification services may be automatically discovered by one or more subscribers and/or publishers, which is described in U.S. patent application Ser. No. 12/042,307, entitled "Automatic Notification System and Process", filed on Mar. 4, 2008, which is hereby incorporated by reference in its entirety.

A mobile device establishes a data context (e.g., a Packet Data Protocol (PDP) context) with one or more network elements that provide data services to the mobile device (e.g., Internet Protocol traffic from the Internet) over a network (e.g., a cellular network such as a Generic Packet Radio Services (GPRS) network, and/or a Local Area Network (LAN)). The data context is a logical association between the mobile device and the network elements, and includes information relating to routing (e.g., IP address information), Quality of Service (QoS), billing, authentication, etc. Since maintaining a data context consumes network resources of the network elements, the one or more servers may teardown a data context associated with a mobile device if the mobile device is not actively using the data context. For example, if the mobile device is turned off (and thus is not using the data context and not contacting the network elements), the network elements may teardown the data context after some time of not receiving information from the mobile device. The mobile device may periodically refresh the data context to keep the data context connection up.

In order to conserve battery life, a mobile device may enter into a reduced power mode when not connected to a constant power supply and not actively being used (e.g., an idle state). This is typically referred to as "sleep" mode. The sleep mode of particular mobile devices may be different depending on the characteristics of the mobile device. For example, in the case where the mobile device has network access, (e.g., cellular access, WiFi access, etc.), a sleep mode may include temporally putting the main processor to sleep and turning off the display, yet keeping the radio stack in an operable function.

Thus, while in sleep mode, an exemplary mobile device may continue to receive phone calls and/or items of interest from notification services (e.g., email messages from a push email service and/or from a pull email service). Once received, the mobile device may be awakened to process those phone calls and/or notifications. For example, a mobile device awakes after receiving a phone call while in sleep mode so a user may answer the phone call. Additionally, typical mobile devices typically cannot refresh the data context while in sleep mode (thus, a mobile device typically needs to be awake to refresh a data context).

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
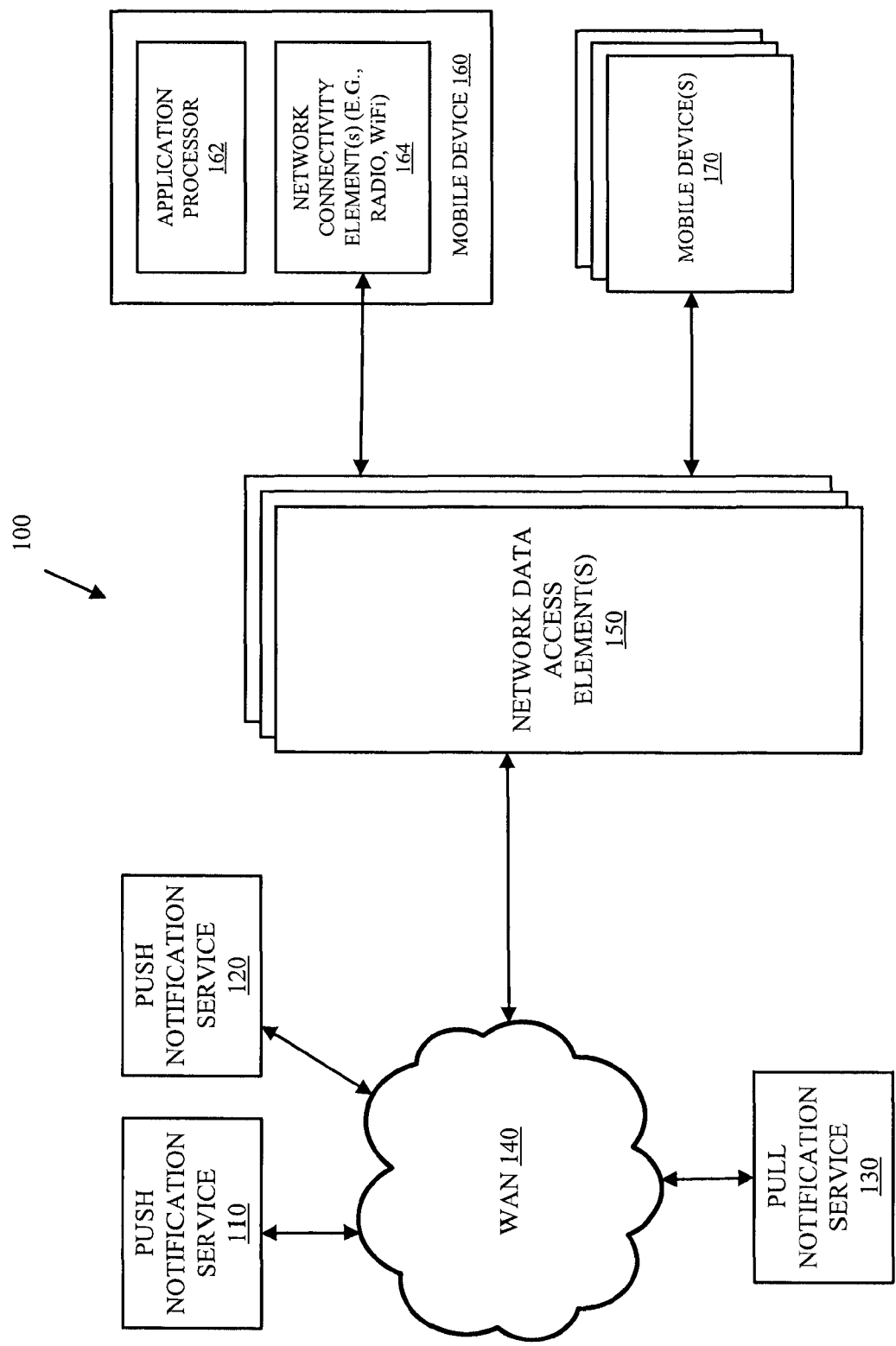
FIG. 1 illustrates an exemplary computing environment according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a mobile device (e.g., laptop, palmtop, portable media player, smartphone, multimedia mobile phone, mobile gaming system, etc.), a non-mobile device (e.g., desktop computer, workstation, server, etc.). Such electronic devices store and communicate (internally and with other electronic devices over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard, a keypad, a touchscreen, and/or a display), and one or more network connections. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

A method and apparatus for managing notification service connections is described. In one embodiment of the invention, a mobile device (e.g., laptop, palmtop, portable media player, smartphone, multimedia mobile phone, mobile gaming systems such as a "Gameboy", etc.) includes one or more notification service clients (e.g., push notification service clients (e.g., push email clients such as .Mac, Microsoft Exchange, push-IMAP, Yahoo! Push, etc., update/upgrade services, news services, weblog services, podcast services, etc.) and/or pull notification service clients (e.g., pull email clients such as POP3, IMAP, etc.)). For each notification service client, the mobile device independently schedules a notification service connection message transmission interval and sets a notification service connection message transmission timer. In addition, a notification service connection message transmission window is associated with each notification service connection message transmission interval and is based on the value of the notification service connection message transmission interval. Upon a notification service connection message transmission timer expiring for a particular notification service client, the mobile device transmits a notification service connection message for that notification service, and also transmits a notification service connection message for each other notification service whose notification service connection message transmission window overlaps that expiring transmission timer. The mobile device resets the notification service connection message transmission timer for each notification service upon transmitting a notification service connection message.

In one embodiment of the invention, for each notification service connection, the mobile device schedules a time to wake the mobile device, if the mobile device is in sleep mode, in order to transmit a notification service connection message. If the mobile device is awake at a certain time, or is awakened during a scheduled wake at a certain time, the mobile device transmits a notification service connection message for each notification service whose notification service connection message transmission window overlaps that certain time. The mobile device resets the notification service connection message transmission timer for each notification service after transmitting a notification service connection message.

FIG. 1 illustrates an exemplary computing environment 100 according to one embodiment of the invention. The computing environment 100 includes the mobile devices 160 and 170 which are each coupled with one or more network data access elements 150. The network data access element(s) 150 may be part of various types of networks in different embodiments of the invention, including cellular networks (e.g., Global System for Mobile Communications (GSM), Enhanced Data Rates for GSM Evolution (EDGE), General Packet Radio Service (GPRS), Code Division Multiple Access (CDMA), Universal Mobile Telecommunications System (UMTS), or other cellular networks), Local Area Networks (LANs), etc. For example, if the network data access element(s) 150 are part of a GSM network, the network data access element(s) 150 may include one or more of base transceiver stations (BTSs), Base Station Controllers (BSCs), Mobile Switching Centers (MSCs), Serving GPRS Support Nodes (SGSNs), etc. As another example, if the network data access element(s) 150 are part of a LAN, the network data access element(s) 150 may include one or more network switches, routers, hubs, modems, etc.

The mobile device 160 includes the application processor 162 and the network connectivity element(s) 164 (e.g., wireless network connectivity elements (e.g., radio network connectivity elements for cellular telephony, WiFi network connectivity elements), wired network connectivity elements (e.g., wired network interface controller(s) (NICs))). The mobile device 160 communicates with the network data access element(s) 150 via the network connectivity element(s) 164, through a data context (e.g., a PDP context). The Wide Area Network (WAN) 140 (e.g., the Internet) is coupled with the network data access elements 150. The push notification services 110 and 120 and the pull notification service 130 are coupled with the WAN 140. According to one embodiment of the invention, a user of the mobile device 160 accesses and uses the push notification services 110 and 120 and the pull notification service 130 (the push notification services 110 and 120 and the pull notification service 130 provide items of interest for the user). For example, the push notification service 110 may be providing a personal push email account for the user of the mobile device 160 while the push notification service 120 may be providing a work push email account for the user of the mobile device 160. As another example, the pull notification service 130 may be providing an organizational pull email account (e.g., POP3 email account, webmail account, etc.) for the user of the mobile device 160.

In one embodiment of the invention, the application processor 162 is the central processor of the mobile device 160. For example, the application processor 162 processes the operating system(s) of the mobile device 160 (the operating system is not illustrated in FIG. 1 in order not to obscure understanding of the invention), and any applications running on the mobile device 160. Other well known features of mobile devices are not illustrated in FIG. 1 in order not to obscure understanding of the invention, including input/output devices, memory(ies), power supply, displays, etc.

According to one embodiment of the invention, the mobile device 160 is capable of entering into a reduced power mode, known as "sleep mode". For example, if the mobile device 160 is not coupled with a constant power supply (e.g., not plugged into an electrical outlet), the mobile device 160 may periodically enter into sleep mode to conserve battery life of the device. The mobile device 160 may enter sleep mode in a number of different ways, including after a period of inactivity (e.g., 30 minutes of inactivity) and/or directly by command from a user (e.g., a user may issue a command to the mobile device 160 to enter into sleep mode). It will be understood that other mechanisms of entering into sleep mode are within the scope of the invention.

During sleep mode, according to one embodiment of the invention, the mobile device 160 temporarily disables the application processor 162 (the application processor 162 may consume virtually no power when temporarily disabled). It should be understood that if the application processor 162 is disabled, the operating system and applications of the mobile device 160 are also disabled. However, according to one embodiment of the invention, at least some of the network connectivity element(s) 164 are not temporarily disabled. In other words, at least some of the network connectivity element(s) 164 may continue to receive information from the network data access elements 150, and use power. For example, if the mobile device 160 has the capability of receiving phone calls and/or text messages (e.g., Short Message Service (SMS) messages) the mobile device 160 may keep awake a radio connectivity element during sleep mode in order to receive phone calls and/or text messages. If the mobile device 160 disabled the radio connectivity element, for example, a user of the mobile device 160 would not be able to receive a phone call and/or text message (e.g., a phone call may instead be forwarded to voice mail if supported). It should be understood that in order to process those received phone calls and/or text messages (e.g., in order for a user to answer an incoming phone call), the mobile device 160 awakens from sleep mode (e.g., re-enables the application processor 162).

In addition, according to one embodiment of the invention, the mobile device 160 includes the capability of receiving items of interest from the push notification services 110-120 during sleep mode. For example, at least some of the network connectivity element(s) 164 have the capability of receiving the items of interest from the push notification services 110 and 120 during sleep mode (e.g., email messages, calendar updates, weather updates, stock updates, etc.). In one embodiment of the invention, a radio network connectivity element receives the items of interest sent from the push notification services 110 and 120 during sleep mode. Thus, during sleep mode, if the push notification services 110 and 120 provide push email service for a user of the mobile device 160, the mobile device 160 may receive email messages from the push notification services 110 and 120. According to one embodiment of the invention, the mobile device 160 awakens from sleep mode to process items of interest received during sleep mode.

While in some embodiments of the invention WiFi network connectivity elements are awake and functioning during sleep mode (and capable of receiving items of interest from the push notification services 110 and 120), in alternative embodiments of the invention WiFi network connectivity elements are put to sleep during sleep mode. Typically a radio network connectivity element uses less power than a WiFi network connectivity element. Thus, keeping a WiFi network connectivity element awake during sleep mode causes a greater amount of power to be depleted than compared to keeping a radio network connectivity element awake. Thus, in some embodiments of the invention, the mobile device 160 may receive items of interest from the push notification services 110 and 120 during sleep mode via a WiFi network connectivity element, while in other embodiments of the invention the mobile device 160 does not receive items of interest during sleep mode via the WiFi network connectivity element.

In some embodiments of the invention, the mobile device 160 may use a combination of network connectivity elements to receive items of interest from the push notification services 110 and 120. For example, the mobile device 160 may support receiving data information via a radio network connectivity element (e.g., through a cellular network) and/or via a WiFi network connectivity element (e.g., when connected at a home LAN). The user of the mobile device 160 may configure the mobile device 160 such that a WiFi network connectivity element is used when WiFi service is available (e.g., while connected at a home LAN and/or work LAN) and the radio network connectivity element is used when WiFi service is not available. Thus, in one embodiment of the invention, a radio network connectivity element and/or a WiFi network connectivity element may be used to receive items of interest from the push notification services 110 and 120 depending on which network connectivity element is providing data support. In addition, in one embodiment of the invention, a radio network connectivity element and/or a WiFi network connectivity element may be used to receive items of interest from the push notification services 110 and 120 during sleep mode depending on which network connectivity element was providing data support prior to entering into sleep mode (e.g., if within a LAN and the WiFi network connectivity element was receiving items of interest from the push notification services 110 and 120 while the mobile device 160 was awake, during sleep mode the WiFi network connectivity element stays awake to receive items of interest and the mobile device 160 places the radio network connectivity element to sleep).

In one embodiment of the invention, since a WiFi network connectivity element typically uses more power than a radio network connectivity element, regardless of which network connectivity element was providing data support prior to entering into sleep mode, the mobile device 160 puts the WiFi network connectivity element to sleep (e.g., temporarily disables the WiFi network connectivity element) and uses a radio network connectivity element to receive items of interest from the push notification services during sleep mode. For example, if the mobile device 160 is connected with the push notification services 110 and 120 via a LAN (e.g., a home LAN of the user) and the user issues a command to place the mobile device 160 into sleep mode, the mobile device 160 automatically transitions to connecting with the push notification services 110 and 120 via a cellular network (through a radio connectivity element) and places the WiFi connectivity element to sleep.

The persistent notification service connections (e.g., push notification services 110 and 120) are periodically refreshed in order to maintain the persistency of the connections in some embodiments of the invention. For example, the push notification services 110 and 120 may timeout a connection to the mobile device 160 (thus stopping push notification services for the user) if the mobile device does not actively use that connection. Thus, in some embodiments of the invention, the mobile device 160 is required to communicate with the push notification services 110 and 120 in order to maintain its persistent connections. For example, at some periodic interval, the mobile device 160 transmits a notification service connection message to the push notification services 110 and 120 to refresh the connections. The notification service connection message informs the push notification services 110 and 120 that the mobile device 160 is still connected (and presumably wishes to continue to receive items of interest from the push notification services). It should be understood that refreshing the push notification connections informs the push notification service's servers that the mobile device wishes to remain connected to the service. In addition, refreshing the push notification connections informs each network element along the route to the push notification service's servers to maintain the connection (otherwise, e.g., a network element may clear the network resources associated with that connection). The notification service connection message may be a ping message or other keep alive message. The notification services may respond to a notification service connection message to notify the mobile device 160 that the connection is active. Thus, if the mobile device 160 does not receive a response from a notification service, the mobile device 160 may be required to re-establish the session with the notification service. It should be understood that in some embodiments of the invention, receipt of an item of interest from a notification service also refreshes the persistent notification service connection.

The interval of transmitting a notification service connection message may be different for individual notification services. For example, the push notification service 110 may cause a timeout of the connection if there is 30 minutes of no communication while the push notification service 120 may cause a timeout of the connection if there is 15 minutes of no communication. However, these timeout intervals are not static and may change dynamically depending on different network conditions. In addition, the notification services may not notify the mobile device that a timeout interval has been modified. Thus, the mobile device 160, in an attempt to maintain the connection (without having to re-establish the connection), may transmit a notification service connection message within the known timeout interval. It will be understood that the mobile device 160 is required to be awake to transmit a notification service connection message to refresh and maintain a notification service connection.

In addition, in some embodiments of the invention, the mobile device 160 is required to periodically refresh the connection with the network data access element(s) 150 in order to maintain network data connectivity (e.g. such as NAT routers in the carrier's network, firewalls, or other network elements in the network). For example, since the data context consumes network resources, the network data access element(s) 150 may tear down the data context if it is not actively being used and/or has not been used in a certain amount of time (e.g., the data context is removed and the network resources of that data context are reallocated). It should be understood that if the data context is torn down, the mobile device 160 is not connected with any notification services. Of course, it should also be understood that the data context may be torn down for other reasons besides period of inactivity (e.g., if the location of the mobile device is out of range of the network, if the mobile device 160 is turned off, etc.). In other embodiments of the invention, the data context does not have to be refreshed by the mobile device 160. Typically, the data context timeout interval is less than the notification service timeout interval. If the data context is up, a notification service connection message transmitted by the mobile device 160 to a notification service inherently refreshes the connection with the network data access element(s) 150.

Figure 2:
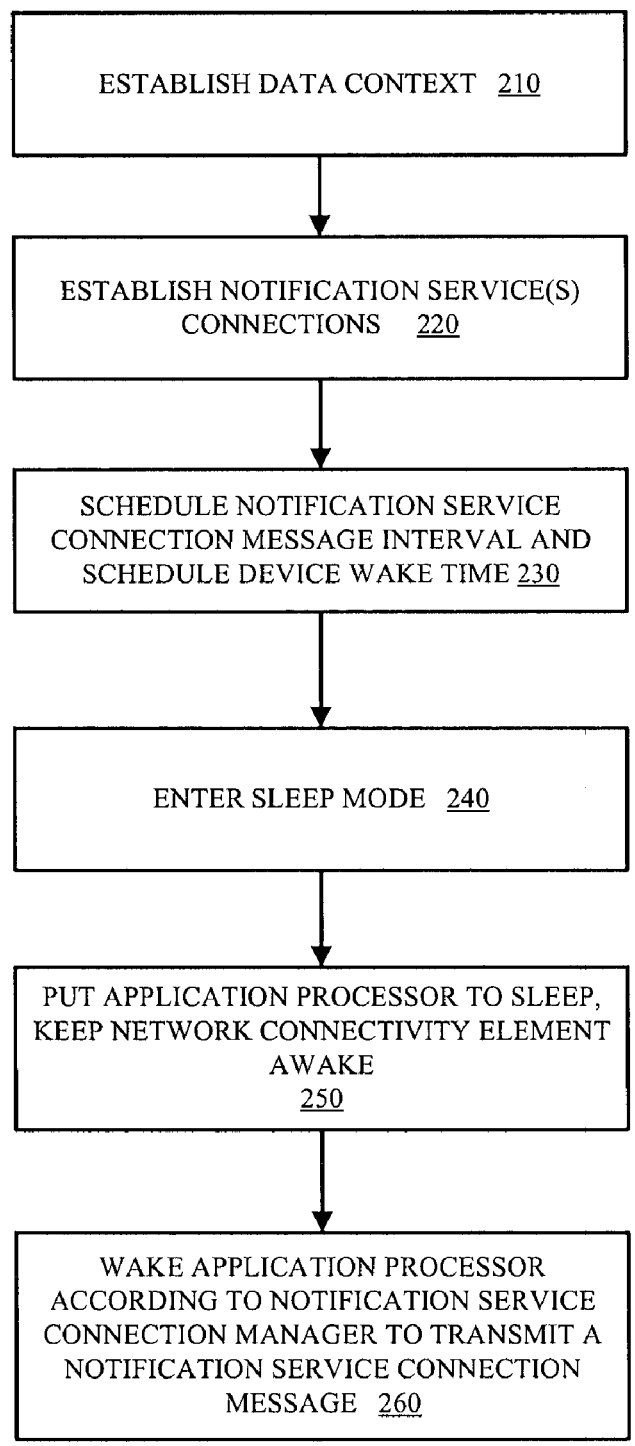
FIG. 2 illustrates an exemplary flow for a mobile device establishing notification service connections and scheduling notification service connection message transmission intervals according to one embodiment of the invention.

FIG. 2 illustrates an exemplary flow for a mobile device establishing notification service connections and scheduling notification service connection message transmission intervals according to one embodiment of the invention. The operations of FIG. 2 will be described with reference to the exemplary embodiment of FIGS. 1, 3A, and 4. However, it should be understood that the operations of FIG. 2 can be performed by embodiments of the invention other than those discussed with reference to FIGS. 1, 3A, and 4, and the embodiments discussed with reference to FIGS. 1, 3A, and 4 can perform operations different than those discussed with reference to FIG. 2.

At block 210, the mobile device 160 establishes a data context. The data context may be established by any number of methods known in the art. From block 210, flow moves to block 220 where the mobile device 160 establishes one or more notification services connections. For example, referring to FIG. 1, the mobile device 160 establishes a connection with the push notification services 110 and 120 and the pull notification service 130. In some embodiments of the invention, the connections are each Transmission Control Protocol (TCP) connections. Flow moves from block 220 to block 230.

At block 230, the mobile device schedules a notification service connection message transmission interval and schedules device wake times for each of the notification service connections. For example, the mobile device 160 may schedule a notification service connection message transmission interval of 30 minutes for the push notification service 110, an interval of 15 minutes for the push notification service 120, and an interval of 25 minutes for the pull notification service 130. In addition, the mobile device 160 may schedule a wake time that coincides with those transmission intervals. Flow moves from block 230 to block 240.

At block 240, the mobile device 160 enters into sleep mode. As described previously, the mobile device 160 may enter sleep mode in a number of different ways, including after a period of inactivity (e.g., 30 minutes of inactivity) and/or directly by command from a user (e.g., a user may issue a command to the mobile device 160 to enter into sleep mode). Flow moves from block 240 to block 250. At block 250, the application processor of the mobile device is put to sleep and the network connectivity element(s) are kept awake, for example, to maintain the notification service connections. Flow moves from block 250 to block 260 where the application processor is wakened according to the notification service connection manager to transmit a notification service connection message.

Figure 3A:
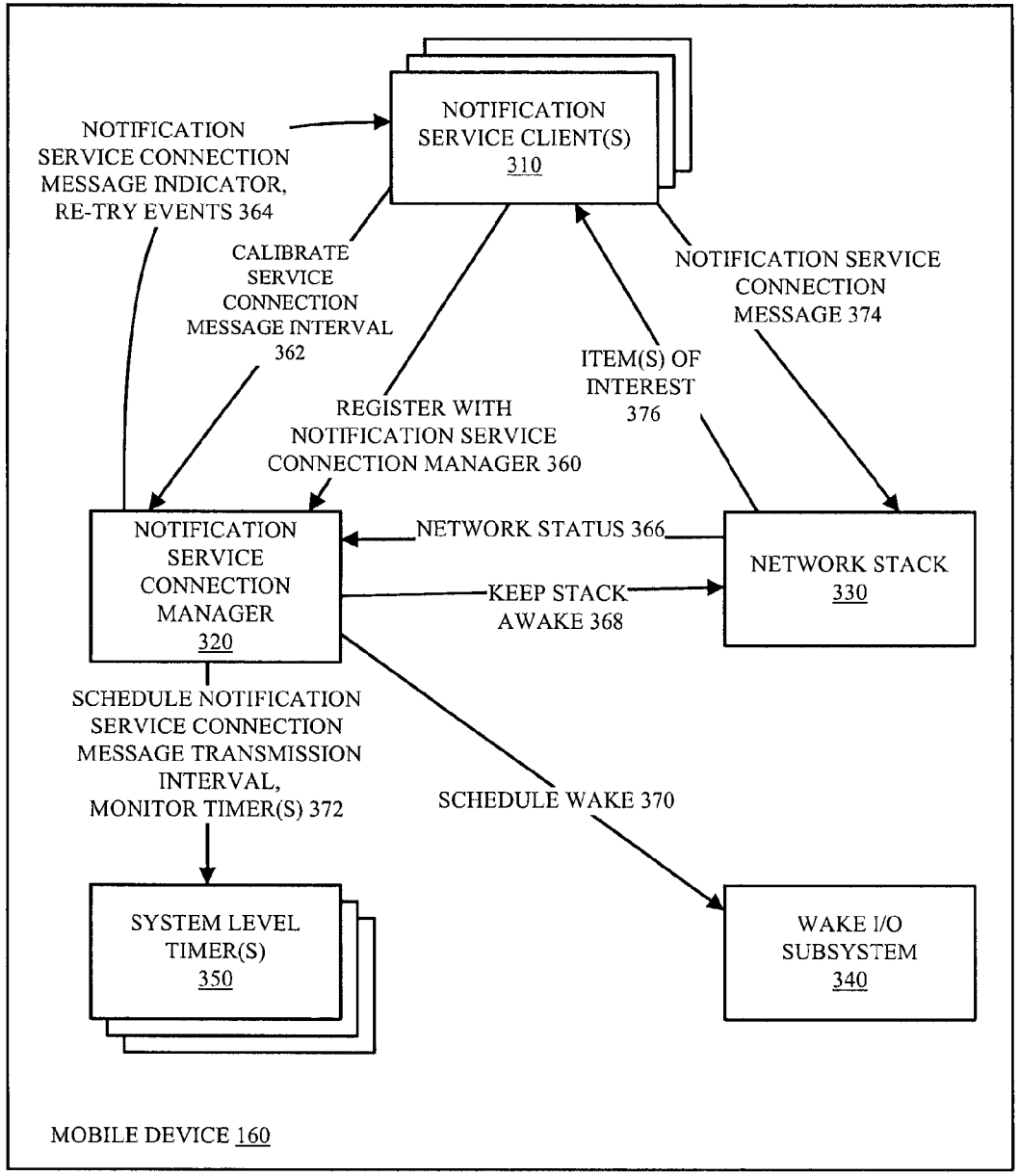
FIG. 3A is a block diagram illustrating a framework of an exemplary mobile device to manage notification service connections according to one embodiment of the invention.

FIG. 3A illustrates a framework used by an exemplary mobile device managing notification service connections according to one embodiment of the invention. For example, the mobile device 160 uses the framework illustrated in FIG. 3A to manage the connections to the push notification services 110 and 120 and the pull notification service 130. The framework includes one or more notification service clients 310. For example, with reference to FIG. 1, there may be a total of three notification service clients 310 (e.g., a notification service client for the push notification service 110, a notification service client for the push notification service 120, and a notification service client for the pull notification service 130). Each notification service client 310 individually is coupled with the service connection manager 320 and the network stack 330. For example, in one embodiment of the invention, each notification service client is an independent process, and does not share memory with other notification service clients and/or does not communicate with other notification service clients. Each notification service client registers 360 with the notification service connection manager 320.

The notification service connection manager 320 is coupled with one or more system level timers 350, the network stack 330, and the wake I/O subsystem 340. The service connection manager 320 schedules a notification service connection message transmission interval with use of the system level timer(s) 350, and monitors those timers, as indicated by numeral 372. In addition, the service connection manager 320, with use of the I/O subsystem 340, schedules wakes of the mobile device in relation to the notification service connection message transmission interval, as indicated by number 370 (e.g., the wake may be scheduled at a time close to the end of the notification service connection message transmission interval), and associates a notification service connection message transmission window with the notification service connection message transmission interval. The service connection manager 320 also keeps the network stack 330 alive during a sleep mode of the mobile device, as indicated by numeral 368.

The network stack 330 includes support for the network connectivity elements (e.g., radio connectivity element and/or WiFi connectivity element). The network stack 330 is used to communicate with the notification services (and with other entities throughout the network). The network stack 330 provides the notification service connection manager 320 with the status of the network, as indicated by numeral 366. For example, the notification service connection manager 320 notifies the service connection manager 320 of network conditions (e.g., network congestion, statistics, etc.). In addition, the network stack 330 receives item(s) of interest from the network services and transmits them to the appropriate notification service client 310, as indicated by numeral 376. In addition, the network stack 330 notifies the notification service client 320 if a communication from one of the notifications services was received (e.g., if a reply to a notification service connection message transmission was received).

According to one embodiment of the invention, after a timer for a notification service connection has elapsed, the service connection manager 320 instructs the notification service client 310 to transmit a notification service connection message, and also notifies the notification service client 310 of any re-try events, as indicated by the number 364 (e.g., a re-try event may include re-establishing a dropped notification service connection). The notification service client 310, with use of the network stack 330, transmits notification service connection messages, as indicated by numeral 374. In addition, the notification service client 310 may instruct the service connection manager 320 to calibrate the notification service connection message transmission interval, as indicated by number 362. Calibrating the notification service connection message transmission interval is discussed in greater detail with reference to FIG. 6.

Figure 3B:
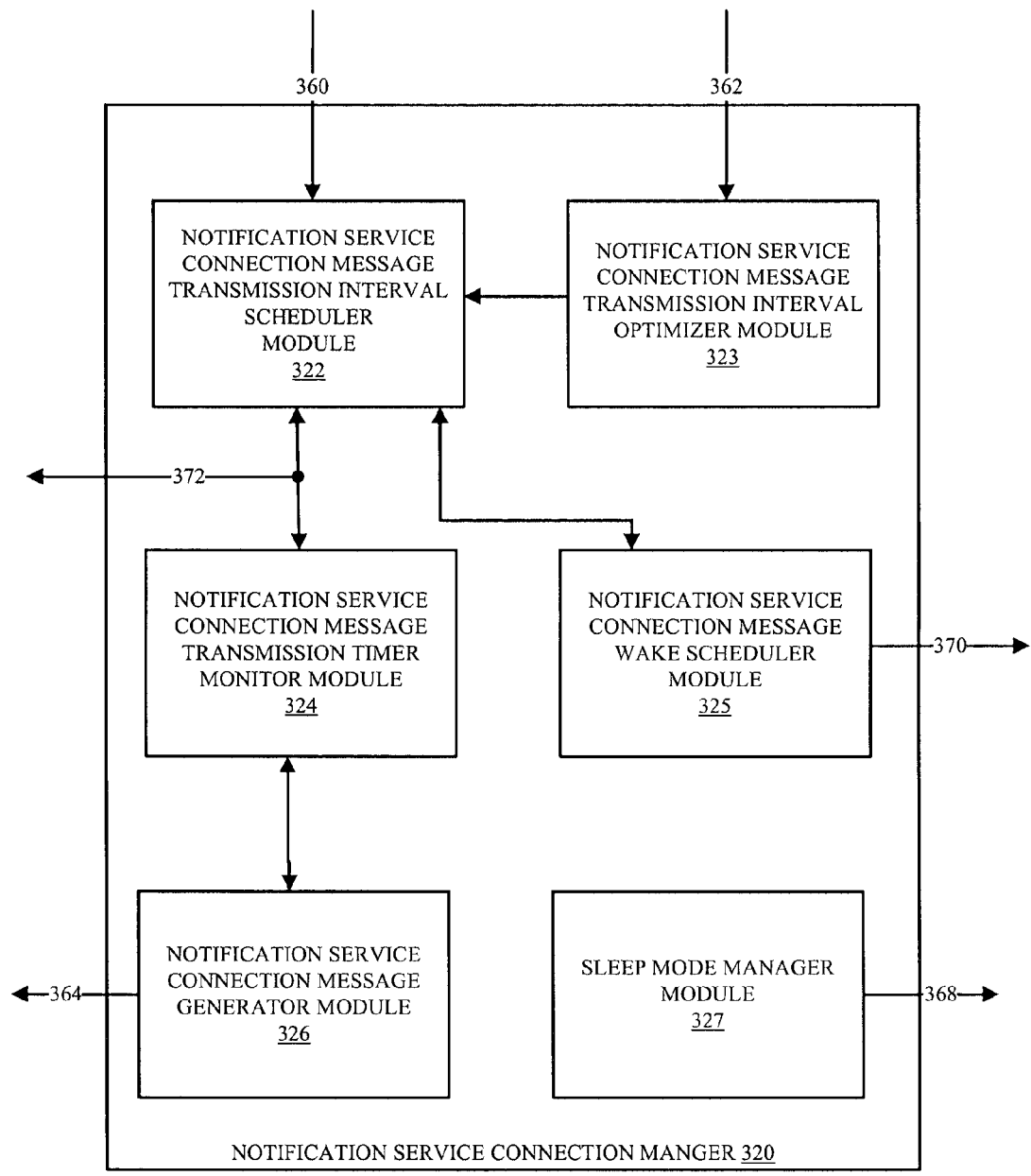
FIG. 3B is a block diagram illustrating an exploded view of the notification service connection manager of FIG. 3A according to one embodiment of the invention.

FIG. 3B is a block diagram illustrating an exploded view of the notification service connection manager 320 of FIG. 3A according to one embodiment of the invention. The notification service connection manager 320 includes the notification service connection message transmission interval scheduler module 322, the notification service connection message transmission interval optimizer module 323, the notification service connection message transmission timer monitor module 324, the notification service connection message wake scheduler module 325, the notification service connection message generator module 326, and the sleep mode manager module 327.

According to one embodiment of the invention, the interval scheduler module 322 schedules the notification service connection message transmission intervals. In addition, the interval scheduler module associates a notification service connection message transmission window with the scheduled notification service connection message transmission intervals. The interval scheduler module 322 is coupled with the notification service connection message transmission timer monitor module 324. In one embodiment of the invention, the timer monitor module monitors the one or more system level timer(s) 350 including a notification service connection message transmission timer. The interval scheduler module 322 is also coupled with the notification service connection message wake scheduler module. According to one embodiment of the invention, the wake scheduler module 322 schedules wakes of the mobile device based on notification service connection message transmission intervals.

The timer monitor module 324 is coupled with the notification service connection message generator module 326. According to one embodiment of the invention, the message generator module 326 alerts the notification service client(s) 310 to issue a notification service connection message. The interval optimizer module 323 is coupled with the interval scheduler module 322. According to one embodiment of the invention, the interval optimizer module optimizes notification service connection message transmission intervals, which will be described in greater detail with reference to FIG. 6. In one embodiment of the invention, the sleep mode manager 327 keeps the network stack 330 awake during a sleep mode.

Figure 4:
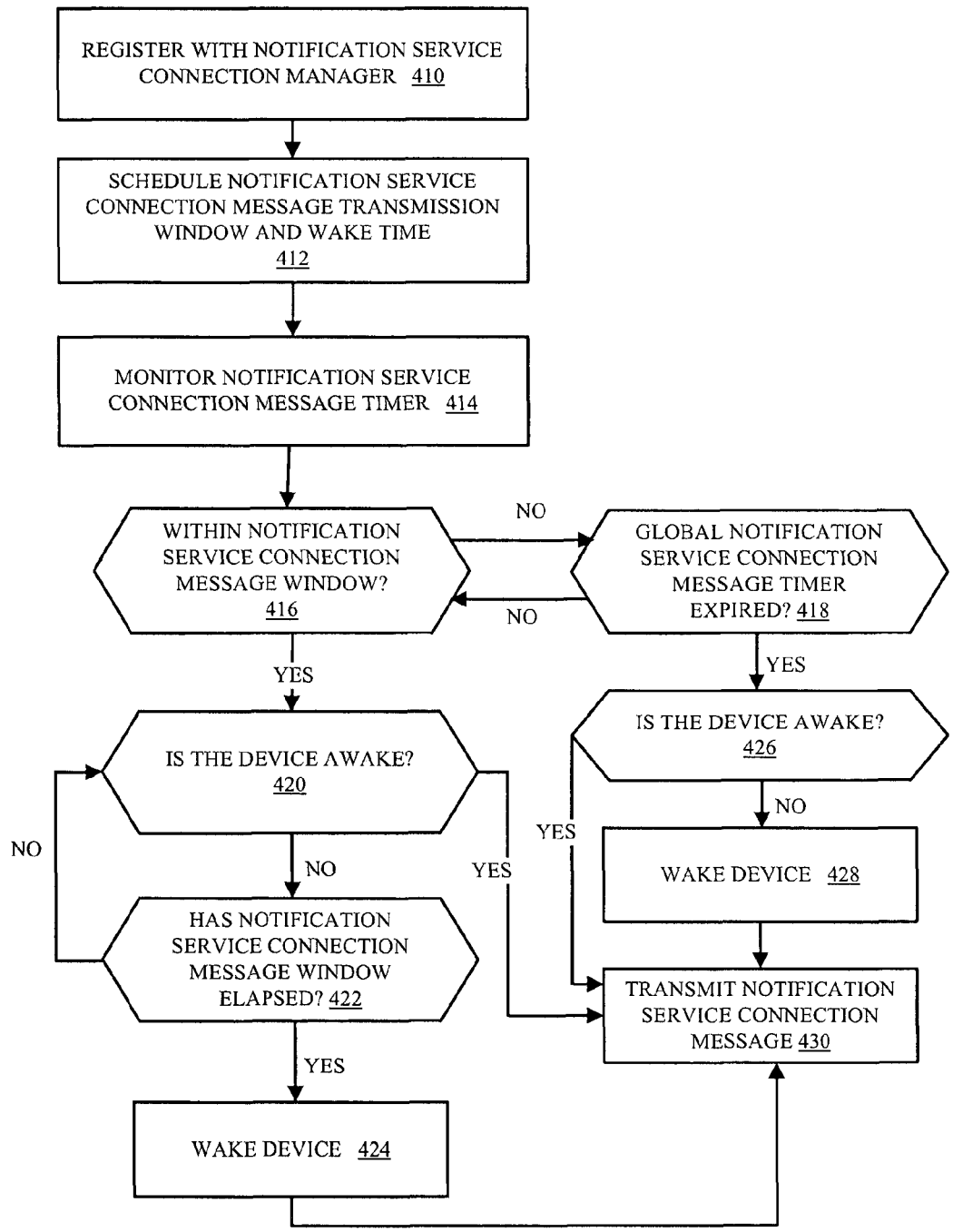
FIG. 4 is a flow diagram illustrating managing notification service connections according to one embodiment of the invention.
Figure 5:
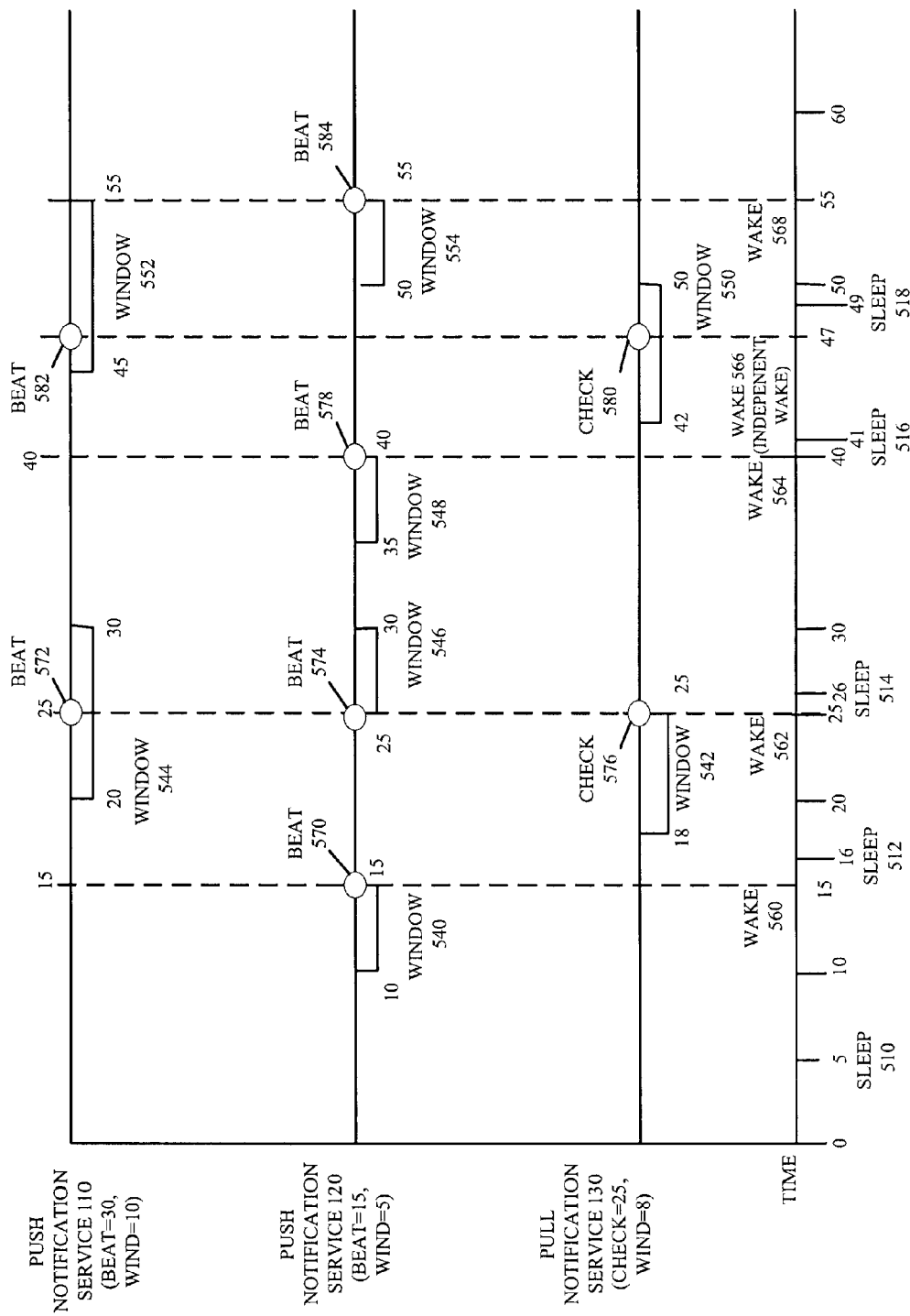
FIG. 5 is an exemplary graph illustrating a mobile device synchronizing transmission of notification service connection messages based on overlapping notification service connection message transmission windows according to one embodiment of the invention.

FIG. 4 is a flow diagram illustrating managing notification service connections according to one embodiment of the invention. The operations of FIG. 4 will be described with reference to the exemplary embodiments of FIGS. 3A and 5. However, it should be understood that the operations of FIG. 4 can be performed by embodiments of the invention other than those discussed with reference to FIGS. 3A and 5, and the embodiments discussed with reference to FIGS. 3A and 5 can perform operations different than those discussed with reference to FIG. 4. FIG. 5 is an exemplary graph illustrating a mobile device synchronizing transmission of notification service connection messages based on overlapping notification service connection message transmission windows according to one embodiment of the invention.

According to one embodiment of the invention, each notification service client on a mobile device performs the operations of FIG. 4, independently. At block 410, a notification service client (e.g., a push notification service client or a pull notification service client) registers with a notification service connection manager. For example, with reference to FIGS. 3A and 5, the notification push notification services 110, 120, and the notification pull notification service 130 (each a notification service client 310) each independently register with the notification service connection manager 360. From block 410, flow moves to block 412.

At block 412, the mobile device 160 schedules a notification service connection message transmission interval and a wake time in relation to the service connection message transmission interval for each notification service. However, as will be described later herein, the actual wake times of the mobile device for a particular notification service connection may differ depending on other notification services. According to one embodiment of the invention, the initial service connection message transmission interval for the persistent notification services (e.g., push notification services) is based on a notification service timeout value provided by each persistent notification service. For example, referring to FIG. 5, the push notification service 110 includes a notification service timeout value of 30 minutes (thus, if the connection to the push notification service 110 is not used within a 30 minute time period, the push notification service 110 may remove that connection), and the push notification service 110 includes a notification service timeout value of 15 minutes. In order to simplify understanding of the invention, in FIG. 5, the notification service connection message transmission intervals for the push notification services 110 and 120 coincide with the timeout value. For example, the notification service connection message transmission interval is 30 minutes for the push notification service 110 and 15 minutes for the push notification service 120. However, it should be understood that the notification service connection message transmission interval may not coincide with the timeout value (e.g., the interval may be less than the timeout value). It should also be understood that in some embodiments of the invention, the notification service connection message transmission intervals may be optimized and may change over time, which will be described in greater detail with reference to FIG. 6. In addition, in order to simply understanding of the invention, a default wake time for each notification service connection is scheduled at the end of the notification service connection message transmission interval. Also, throughout the discussion of FIG. 5, transmission of a notification service connection message may be referred to as a "heartbeat" or simply a "beat" in reference to a notification service connection message sent to a persistent notification service (e.g., push services 110 and 120).

Referring back to FIG. 4, the mobile device 160 also associates a notification service connection message transmission window with the message transmission interval and sets one or more system timers associated with the message transmission interval. According to one embodiment of the invention, a notification service connection message transmission window is a portion of the message transmission interval where a notification service connection message may be transmitted. For example, if the mobile device is awake during any time within the window, the mobile device may transmit a notification service connection message. In FIG. 5, the notification service connection message transmission windows are roughly a third of the notification service connection message transmission window. For example, the notification service connection message transmission window of the push notification service 110 is 10 minutes before a scheduled transmission of a beat message (e.g., the 10 minutes prior to the scheduled beat), the notification service connection message transmission window of the push notification service 120 is 5 minutes before a scheduled beat, and the notification service connection message transmission window of the pull notification service 130 is 8 minutes before a scheduled pull. Although FIG. 5 illustrates the notification push notification services 110 and 120 and the notification pull notification service 130 starting at the same time (e.g., at time 0), it should be understood that this is for illustrative purposes and these notification services may start at different times. With reference to FIG. 5, the push notification service 110 has an initial scheduled heartbeat and wake time at 30 minutes, the push notification service 120 has an initial scheduled heartbeat and wake time at 15 minutes, and the pull notification service 130 has an initial scheduled pull message and wake time at 25 minutes.

With reference to FIG. 4, flow moves from block 412 to block 412 where the mobile device monitors service connection message timers (e.g., system level timers associated with each service connection) and flow moves to block 416. For example, with reference to FIG. 5, the mobile device monitors timers for the push notification services 110 and 120 and the pull notification service 130. In FIG. 5, at time 5, the mobile device enters into sleep mode 510. Thus, according to one embodiment of the invention, the application processor and the operating system are offline yet the network connectivity element remains awake.

At block 416, the mobile device determines if the time is within a notification service connection message transmission window. If the time is not within a notification service connection message transmission window, then flow moves to block 418 where a determination is made whether a global notification service connection message timer has expired. The global notification service connection message timer will be discussed in greater detail later herein. If time is within a notification service connection message transmission window, then flow moves to block 420 where a determination is made whether the mobile device is awake. If the device is awake, then flow moves to block 430 where the mobile device transmits a notification service connection message. If the mobile device is not awake (i.e., if in sleep mode), then flow moves to block 422 where a determination is made whether a notification service connection message transmission timer has elapsed. For example, referring to FIG. 5, beginning at time 10, the push notification service 120 is within the window 540, and the mobile device 160 is not awake (it is in sleep mode). If the timer has not elapsed, then flow moves back to block 420. If the timer has elapsed, then flow moves to block 424 where the mobile device is awakened and flow moves to block 430 where the mobile device transmits a notification service connection message.

Referring to FIG. 5, the notification service connection message transmission timer associated with the push notification service 120 elapses at time 15. Thus, at time 15, the mobile device 160 is wakened (represented by the dashed line wake 560) and a notification service connection message is transmitted to the push notification service 120 in order to refresh the notification service connection (represented by the beat 570). It should be understood that the mobile device 160 does not transmit a notification service connection message to the push notification service 110 or the pull notification service 130 during the wake time 560. For example, the push notification service 110 has a beat interval of 30 minutes. Thus to refresh the connection to the push notification service 110, a beat may be transmitted up to 30 minutes (i.e., the connection needs only be refreshed once every 30 minutes). If the mobile device 110 transmitted a beat to the push notification service 110 each and every time a beat was transmitted to the push notification service 120, which has a beat interval of 15 minutes, effectively twice as many beat messages as necessary would be transmitted. Thus, according to one embodiment of the invention, the mobile device transmits notification service connection messages to a particular notification service only if it is awake during a notification service connection message transmission window for that particular notification service. Since the wake 560 does not overlap a notification service connection message transmission window for the push notification service 110 or the pull notification service 130, the mobile device does not transmit notification service connection messages for those notification services in order to conserve bandwidth.

According to one embodiment of the invention, the mobile device resets the notification message transmission timer associated with a particular notification service upon transmitting a notification service connection message to the particular notification service. For example, the mobile device 160 resets the notification service connection message transmission timer for the push notification service 120 upon transmitting the beat message 570.

At time 16, the device enters sleep mode 512. In other words, the mobile device 160 was awakened specifically to refresh the notification service connection to the notification push notification service 120 and the device reenters sleep mode in order to conserve battery resources. At time 25, the notification service connection message transmission timer associated with the pull notification service 130 expires (e.g., the time period is at the end of the window 542). Thus, at time 25, the mobile device 160 is wakened (represented by the dashed line wake 562) and a notification service connection message is transmitted to the pull notification service 130 in order to check for items of interest (represented by the check 576). In addition, since the window 544 of the push notification service 110 overlaps the time of the wake 562 (the window 544 begins at time 20 and ends at time 30), and the window 546 of the push notification service 120 overlaps the time of the wake 562 (the window 546 begins at time 25 and ends at time 30), the mobile device 160 transmits a notification service connection message to the push notification service 110 (represented by the beat 572) and transmits a notification service connection message to the push notification service 120 (represented by the beat 574). Thus, during the wake 562, the mobile device 160 transmits a notification service connection message to each of the push notification services 110 and 120 and the pull notification service 130.

Since the mobile device 160 transmitted a notification service connection message to the push notification service 110, the push notification service 120, and the pull notification service 130, according to one embodiment of the invention, the mobile device 160 resets the notification service connection message transmission timer, reschedules the notification service connection message transmission time and wake time, for each notification service. For example, instead of the push notification service 110 having a scheduled notification service connection message transmission time at time 60, since a notification service connection message was transmitted to the push notification service 110 at time 25, the mobile device 160 schedules a notification service connection message transmission at time 55. As another example, instead of the push notification service 120 having a scheduled notification service connection message transmission time at time 45, since a notification service connection message was transmitted to the push notification service 120 at time 25, the mobile device 160 schedules a notification service connection message transmission at time 40. At time 26, the mobile device 160 enters into sleep mode 514.

It should be understood that battery resources are conserved by synchronizing transmission of notification service connection messages based on overlapping notification service connection message transmission windows. For example, consolidating transmission of notification service connection messages for multiple notification services during a same wake period conserves battery resources. For example, waking a mobile device uses a significant amount of battery resources. Additionally, more battery resources are used when waking the device as compared with transmitting notification service connection messages. Thus, transmitting a notification service connection message to multiple notification services during the same wake period conserves battery resources (e.g., the mobile device is not independently awakened from sleep mode for each notification service connection message transmission). Thus, in some embodiments of the invention, synchronizing transmission of notification service connection messages based on overlapping notification service connection message transmission windows reduces the number of mobile device wakes needed, which reduces power consumption. It should be understood that the battery resource savings increase as the number of notification service clients increases.

In addition, while transmission of the notification service connection messages are not necessarily performed at their scheduled transmission time, (e.g., the notification service connection messages may be sent prior to their scheduled transmissions times), the deviance from the scheduled transmission time is low (e.g., typically the notification service connection message transmission window is approximately a third of the notification service connection message transmission interval). Thus, embodiments of the invention conserve bandwidth by transmitting notification service connection messages close to their scheduled transmission time.

At time 40, the notification service connection message transmission timer associated with the push notification service 120 expires (e.g., the time period is at the end of the window 548). Thus, at time 40, the mobile device 160 is wakened (represented by the dashed line wake 564) and a notification service connection message is transmitted to the push notification service 120 in order to refresh the push notification service 120 connection. Since the wake 564 does not overlap a notification service connection message transmission window for the push notification service 110 or the pull notification service 130, the mobile device does not transmit notification service connection messages to those notification services in order to conserve bandwidth. At time 41, the mobile device 160 enters into sleep mode 516.

At time 47, the mobile device 160 is awakened from the sleep mode 516 from an independent event (represented by independent wake 566). There may be many causes of an independent wake, including user interaction (e.g., the user disables sleep mode), receiving an item of interest (e.g., receiving an email message from the push notification service 110), receiving a phone call and/or text message, etc. Once awake, the mobile device determines whether the time is within any notification service connection message transmission window. For example, time 47 is within the window 552 for the push notification service 110 (which starts at time 45 and ends at time 55) and within the window 550 for the pull notification service 130 (which starts at time 42 and ends at time 50). Leveraging the fact that the mobile device is awake and within notification service connection message transmission windows, the mobile device transmits a notification service connection message to the push notification service 110 (represented by the beat 582) to refresh the push notification service connection 110, and transmits a notification service connection message to the pull notification service 130 (represented by the check 580) to check for items of interest. In addition, while not illustrated in FIG. 5 for simplicity purposes, the mobile device 160 resets the notification service connection message transmission timer and reschedules the notification service connection message transmission time and wake for the push notification service 110 and the pull notification service 130. At time 49, the mobile device enters sleep mode 518.

At time 55, the notification service connection message transmission timer associated with the push notification service 120 expires (e.g., the time period is at the end of the window 554). Thus, at time 55, the mobile device 160 is wakened from the sleep mode 518 (represented by the dashed line wake 568) and a notification service connection message is transmitted to the push notification service 120 to refresh the push notification service 120 connection (represented by the beat 584). It should be noted that although the window 552 of the push notification service 110 originally would have overlapped the wake 568, because the beat 582 was transmitted at time 47, and the notification service connection message timer as reset and the notification service connection message transmission time rescheduled, the mobile device 160 does not transmit a notification service connection message to the push notification service 110.

With reference to FIG. 4, as described earlier, at block 418 a determination is made whether a global notification service connection message timer expired. According to one embodiment of the invention, the mobile device transmits a notification service connection message to each notification service at approximately the same time (e.g., within a minute of each other) at a periodic interval (e.g., 4 times a day). If the global notification service connection message timer expires, then flow moves to block 426 where a determination is made whether the mobile device is awake. If the mobile device is awake, then flow moves to block 430 where the mobile device transmits a notification service connection message to each notification service. If the mobile device is not awake, then flow moves to block 428 where the mobile device is awakened and flow moves to block 430 where the mobile device transmits a notification service connection message to each notification service.

Since multiple mobile devices may be accessing the same notification services through the same network (e.g., with reference to FIG. 1, according to one embodiment of the invention the mobile device 160 and the mobile device(s) 170 are at least partially coupled with the same network access data element(s) 150), the global notification service connection message timer is configured so that all of the mobile devices do not transmit a notification service connection message at the same time. According to one embodiment of the invention, these notification service connection message transmission times are randomized using a cryptographically secure pseudo-random number generator (and thus spread throughout the day). For example, a unique identifier of each mobile device (e.g., a universally unique identifier (UUID), a Media Access Control (MAC) address, etc.) modded over a given time interval to determine these global notification service connection message transmission times.

Figure 6:
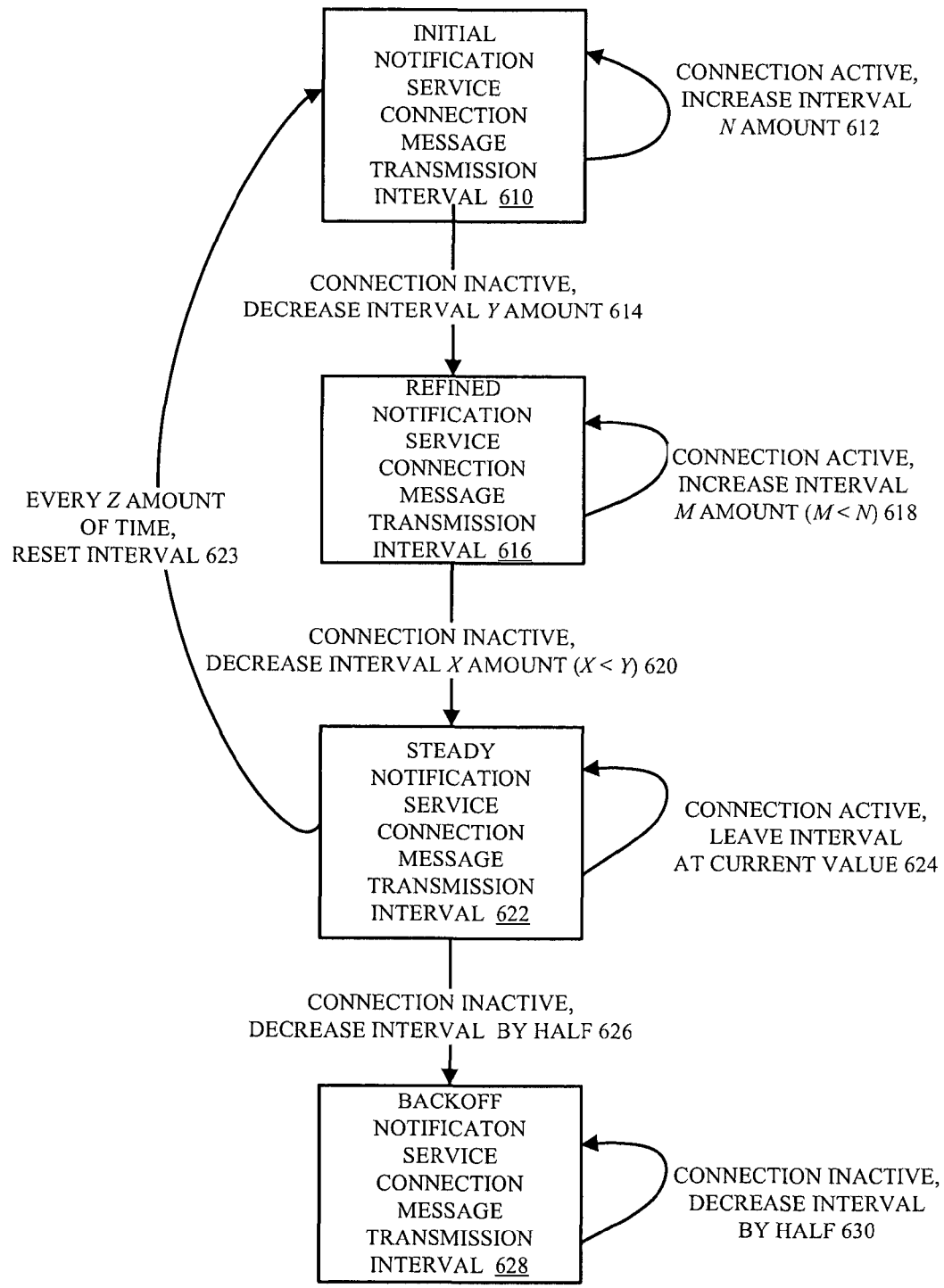
FIG. 6 is an exemplary state diagram illustrating optimizing notification service connection message intervals according to one embodiment of the invention.

As described previously, in some embodiments of the invention, the notification service connection message transmission interval for persistent notification services (e.g., push notification services) may be optimized. In other words, in some embodiments of the invention, the message transmission interval is optimized in order to transmit the least amount of notification service connection messages for persistent notification services while remaining connected to the persistent notification services. FIG. 6 is an exemplary state diagram illustrating optimizing notification service connection message intervals according to one embodiment of the invention. At block 610, an initial notification service connection message transmission interval is determined. For example, the initial notification service connection message transmission interval may be based on a timeout interval of a particular notification service. If the mobile device determines that the connection is active, the message transmission interval is increased by N amount 612 (e.g., 5 minutes). For example, the connection may be determined to be active if a reply message is received from the notification service.

If the mobile device determines that the connection is not active, the message transmission interval is decreased by Y amount 614 (e.g., 5 minutes), and enters a refined notification service connection message transmission interval 616. If the mobile device determines that the connection is active, then the message transmission interval is increased by M amount, where M is less than N 618 (e.g., 2 minutes). If the mobile device determines that the connection is not active, then the message transmission interval is decreased by X amount, where X is less than Y 620.

After some time, connection message transmission interval enters into the steady notification service connection message transmission interval 622 state. When in this state, if the connection is active, the interval value remains at the current value 624. In some embodiments of the invention, after a Z amount of time in the state 622 (e.g., after 8 hours), the connection message transmission interval is reset 623 to the initial notification service connection message transmission interval 610, where the interval optimization process restarts.

Thus, if the notification service connection message transmission interval settles into a relatively high frequency message transmission interval (e.g., a message every 5 minutes), after some period of time the optimization process restarts in an attempt to determine the optimum transmission interval. However, if the connection is not active, the interval is decreased 626 (e.g., decreased by half), and the interval enters the backoff notification service connection message transmission interval 628. When in the backoff state, if the connection is not active, the interval is decreased 630 (e.g., decreased by half).

It should be understood that if a notification service connection is not active, that connection needs to be reestablished. According to one embodiment of the invention, notification service connection retries are scheduled according to wake intervals. For example, with reference to FIG. 5, if the beat 572 failed to refresh the connection to the push notification service 110 at time 25, in one embodiment of the invention, the next wake the mobile device will attempt to reestablish the notification service connection. Thus, during the wake 564 at time 40, the mobile device may attempt to reestablish the notification service connection to the push notification service 110.

In one embodiment of the invention, some applications, responsive to receiving certain notification messages, cause one or more icon badges to be displayed on the graphical user interface of the display (typically in close proximity to the application icon of the application that received the notification message or overlapping that application icon). The icon badges may represent different things for different applications. Typically, the icon badges alert the user of the mobile device of one or more items of interest. For example, different icon badges may represent the number of unread email messages, the number of unread text messages, the number of installed applications which have an update, a number of social networking messages, a number of social networking friends currently online, a number of unread instant messages, a number of unread newsgroup items, a number of unread blog entries, a number of updated podcasts, weather alerts, etc. Icon badges may be numerals, graphics, text, animations, or any combination of numerals, graphics, text, and animations. In some embodiments, applications are programmed to specify whether they will use icon badging and/or the type of icon badging they will use.

As one example, push notification email services (e.g., MobileMe, Microsoft Exchange ActiveSync, push-IMAP, Yahoo! Push, etc.) and/or pull notification email services (e.g., POP3, IMAP, etc.) may display an icon badge (e.g., a numeral icon) which indicates the number of new email messages and/or an icon badge (e.g., a numeral icon) which indicates the number of unread email messages responsive to receiving notification messages that indicate email. Similarly, other applications that receive notification messages may display an icon badge. For example, for a social networking application, an icon badge which indicates the number of friends currently online and/or an icon badge which indicates the number of unread messages may be displayed.

Figure 7:
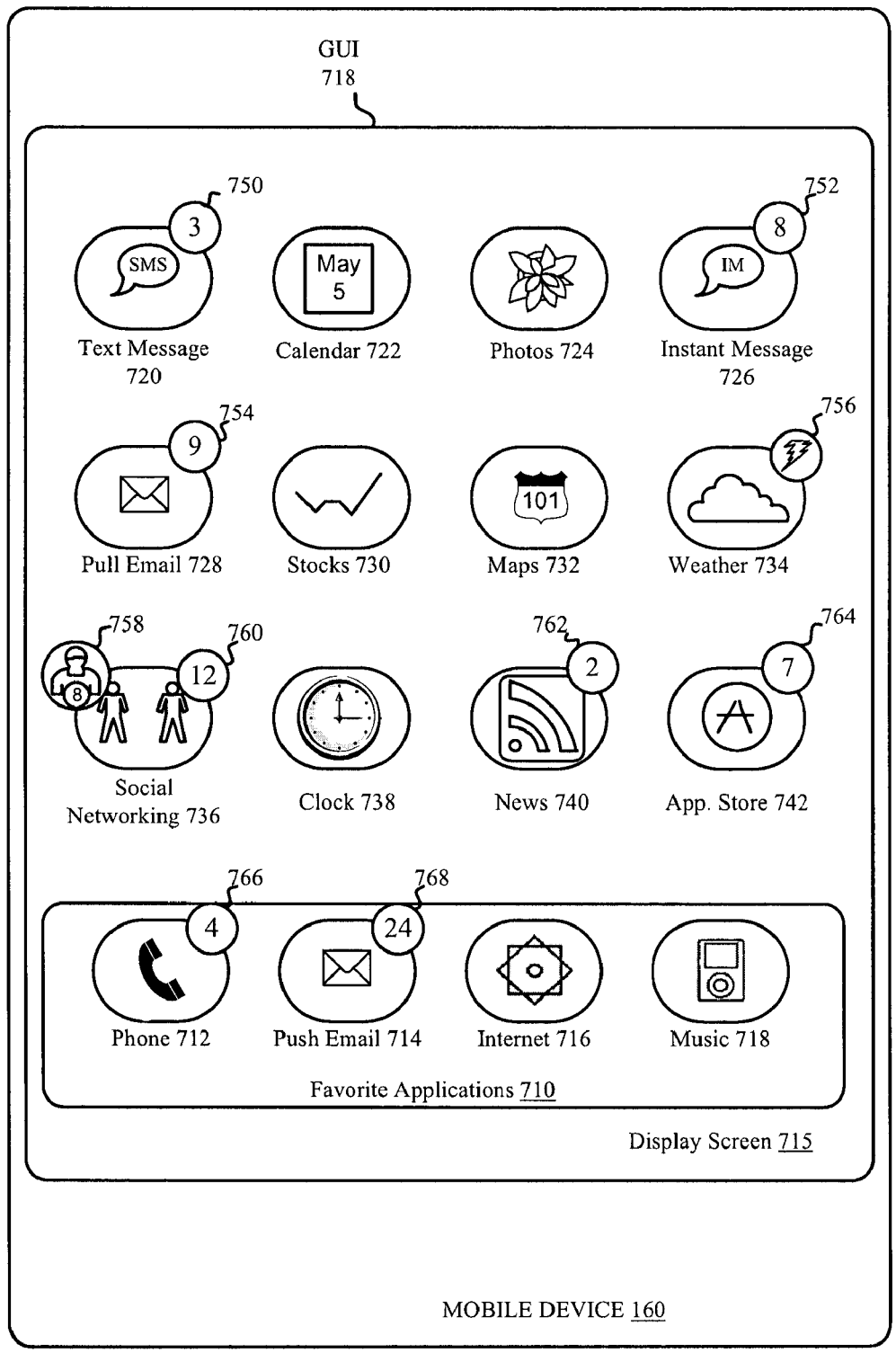
FIG. 7 illustrates an exemplary graphical user interface of the mobile device according to one embodiment of the invention.

FIG. 7 illustrates an exemplary graphical user interface 718 of the mobile device 160 according to one embodiment of the invention. As illustrated in FIG. 7, the mobile device 160 includes the display screen 715, which is currently displaying numerous application icons. Each application icon provides a launching point for a corresponding application. For example, the user may execute (run) a social networking application by selecting the social networking application icon 736. In one embodiment, the display screen 715 is a touch screen. In one embodiment, the display screen illustrated in FIG. 7 is a home page (e.g., a starting page and/or application launching page) of the mobile device 160.

The GUI 718 includes the favorite applications 710, which is a collection of one or more application icons corresponding with applications that are used most often by the user of the mobile device 160 or have been set as favorites of the user of the mobile device 160. The favorite applications 710 include the telephone application icon 712 (which allows users to make phone calls, listen to voicemails, etc.) push email application icon 714, Internet application icon 716 (e.g., an Internet browser), and the music application icon 718 (which allows users to listen to music). Other application icons corresponding with applications on the GUI 718 include the text message application icon 710, the calendar application icon 722, the photos application icon 724, the instant message application icon 726, the pull mail application icon 728, the stock ticker application icon 730, the maps application icon 732, the weather application icon 734, the social networking application icon 736, the clock application icon 738, the news application icon 740 (the news application allows users to read newsfeeds and/or blog feeds (e.g., RSS feeds)), and the application store icon 742 (the application store allows users to download additional applications, or update currently installed applications, for the mobile device 160). It should be understood that the number and type of application icons displayed on the display screen 715 is exemplary and a different number and/or types of application icons may be displayed. In addition, multiple applications may be grouped into a single application icon type in some embodiments. For example, while FIG. 7 illustrates a separate pull email application icon 728 and a separate push email application icon 714, in some embodiments multiple email applications, whether they are push email applications or pull email applications, are grouped under a single email application icon.

Some of the applications may receive notification messages that cause icon badges to be displayed. The icon badges may be displayed in different locations relative to their corresponding application icons in different embodiments of the invention (e.g., overlapping the application icon, within a few pixels of the application icon, etc.). The icon badge 768, which is represented as a numeral and overlaps the push email application icon 714, may represent the number of unread email messages (e.g., twenty-four unread email messages) or the number of new email messages. Similarly, the icon badge 754, which is represented as a numeral and overlaps the pull email application icon 728, may represent the number of unread email messages (e.g., nine unread email messages) or the number of new email messages, the icon badge 750, which is represented as a numeral and overlaps the text message application icon 720, may represent the number of unread text messages (e.g., three text messages) or the number of new text messages, the icon badge 752, which is represented as a numeral and overlaps the instant message application icon 726, may represent the number of unread instant messages (e.g., eight unread instant messages) or the number of new instant messages, the icon badge 762, which is represented as a numeral and overlaps the news application icon 740, may represent the number of unread news items and/or blog items or the number of new news items and/or blog items, and the icon badge 764, which is represented as a numeral and overlaps the application store application icon 742, may represent the number of installed applications which currently has an update that may be downloaded and/or installed.

As illustrated in FIG. 7, in one embodiment, some icon badges are not numerals. For example, the icon badge 756 is illustrated as a graphic (it may also be an animation). The icon badge 756 overlaps the weather application icon 734 and may represent a severe weather alert. The user of the mobile device 160 may use the weather application that corresponds with the weather application icon 734 to set the location(s) they want to receive severe weather alerts on in one embodiment. In another embodiment, the severe weather alerts may correspond to the current location of the mobile device 160. As an example, the current location of the mobile device may be determined through identifying a cellular base station coupled with the mobile device 160, determining the GPS location of the mobile device 160, etc. As illustrated in FIG. 7, a lightning bolt graphic may represent that a severe thunderstorm alert has been issued. Other graphics may be displayed for different severe weather alerts (e.g., rain graphic for flooding watches/warnings, tornado graphic for tornado watches/warnings, snow graphic for blizzard watches/warnings, hurricane graphic for hurricane watches/warnings, etc.).

In addition, some application icons may have multiple icon badges being displayed at any given time in some embodiments. For example, the icon badge 758 and the icon badge 760 each are associated with the social networking application icon 736 (and each overlap a portion of the social networking application icon 736). The icon badge 758, which is a combination of a graphic with a numeral, may be used to represent the current number of social networking contacts (e.g., friends) that are currently online (as illustrated in FIG. 7, a total of eight contacts are currently online). The icon badge 760 may be used to represent the number of unread or new messages on the social networking application corresponding to the social networking application icon 736.

Some of the applications with corresponding application icons illustrated in FIG. 7 correspond to push notification services and some correspond to pull notification services. For example, the push email application corresponding with the push email application icon 714 corresponds with a push notification service and the pull email application corresponding with the pull email application icon 728 corresponds with a pull notification service.

In some embodiments, icon badges may exist for application icons whose applications are not push applications or pull applications. For example, the icon badge 766, which overlaps the telephone application icon 712 and may represent the number of voicemail messages, does not correspond with a push application or a pull application.

Figure 8:
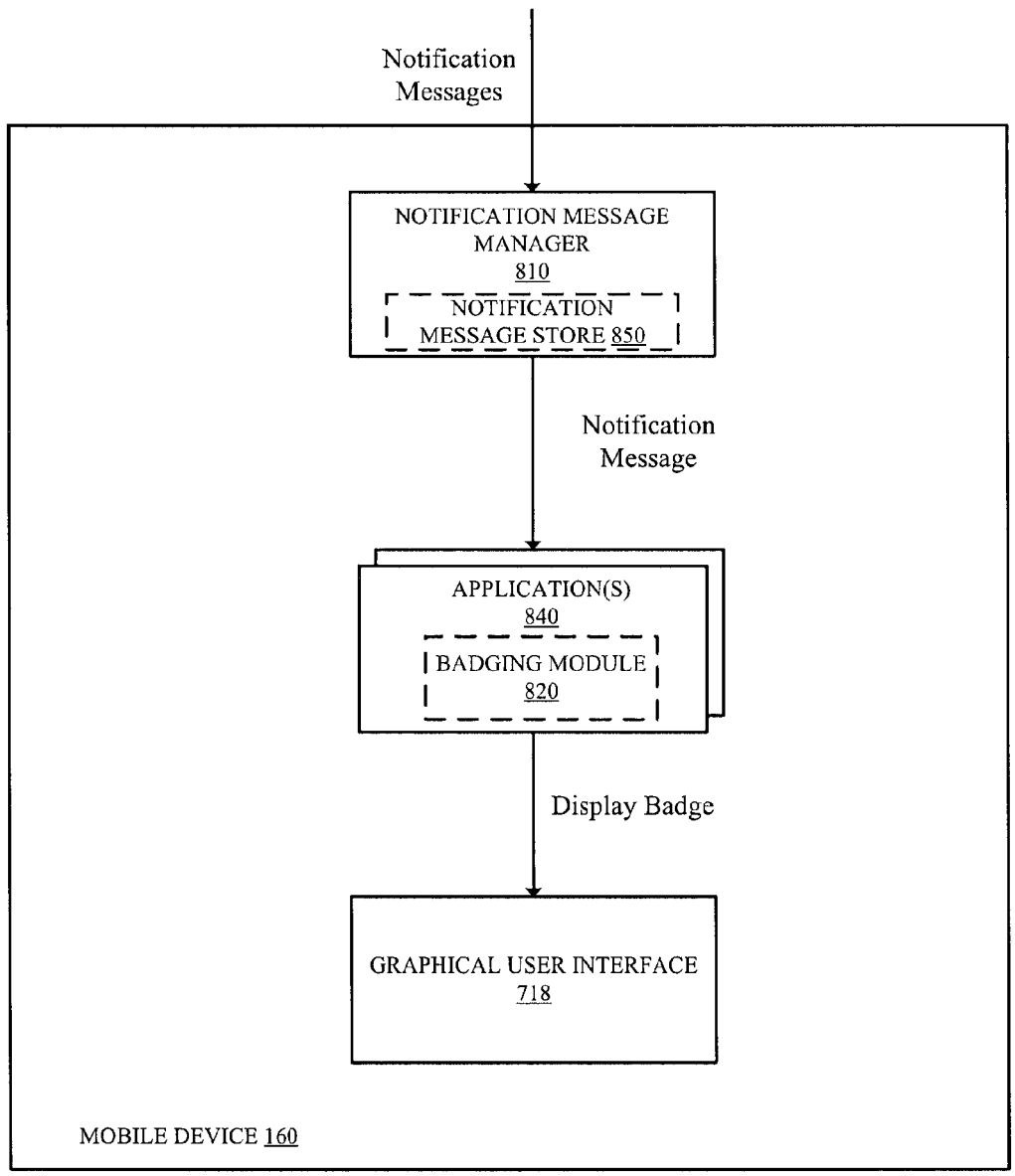
FIG. 8 is a block diagram that illustrates an exemplary architecture of the mobile device to process notification messages according to one embodiment of the invention.

FIG. 8 is a block diagram that illustrates an exemplary architecture of the mobile device 160 to process notification messages according to one embodiment of the invention. FIG. 8 will be described with reference to the exemplary operations illustrated in FIG. 9. However, it should be understood that the operations of FIG. 9 can be performed by embodiments of the invention other than those discussed with reference to FIG. 8, and the embodiments discussed with reference to FIG. 8 can perform operations different than those discussed with reference to FIG. 9. It should also be understood that the architecture illustrated in FIG. 8 is exemplary, and different architectures may be used in different embodiments.

As illustrated in FIG. 8, the mobile device 160 includes the notification message manager 810, one or more applications 840, and the graphical user interface 718. In one embodiment, the notification message manager 810, the application(s) 840, and the GUI 718 are each executed by the application processor 162 of the mobile device 160. The notification message manager 810 receives notification messages from different notification services (e.g., the network connectivity element(s) 164 receive notification messages from the push notification services 110 and 120 and the pull notification service 130 and pass them to the notification message manager 810 for processing). The notification messages are directed to the appropriate applications for processing including determining whether to display an icon badge on the graphical user interface 718.

Figure 9:
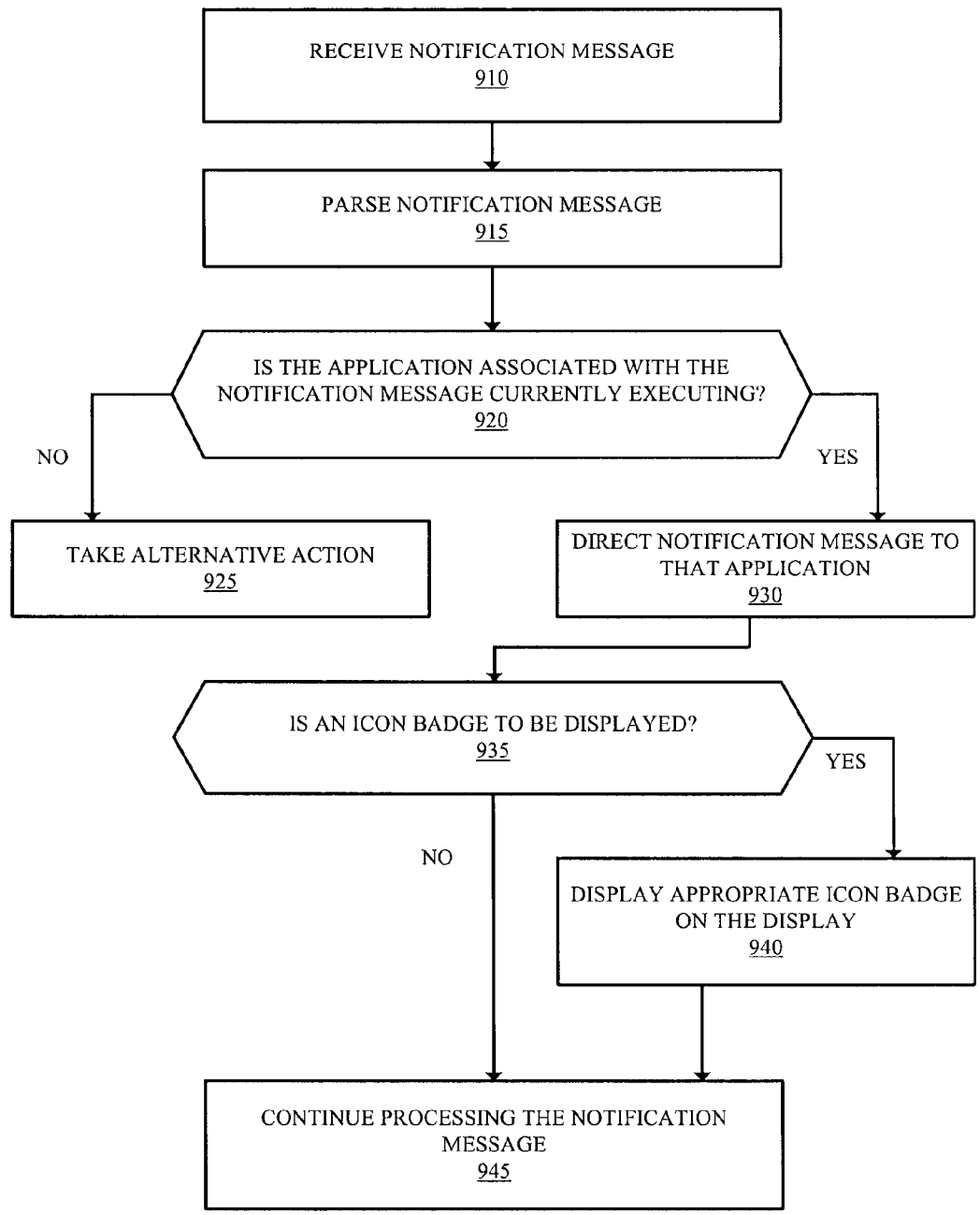
FIG. 9 is a flow diagram illustrating exemplary operations for processing notification messages according to one embodiment of the invention.

With reference to FIG. 9, at block 910, the notification message manager 810 receives a notification message. Flow moves from block 910 to block 915, where the notification message manager 810 parses the received notification message. In one embodiment, each notification message includes an application identifier which identifiers which application the notification message is for. Flow moves from block 915 to block 920, where the notification message manager 810 determines whether the application associated with notification message is currently executing (running) on the mobile device 160. If the application is currently running, then flow moves to block 930 where the notification message manager 810 directs the notification message to its application. Flow moves from block 930 to block 935.

Figure 12:
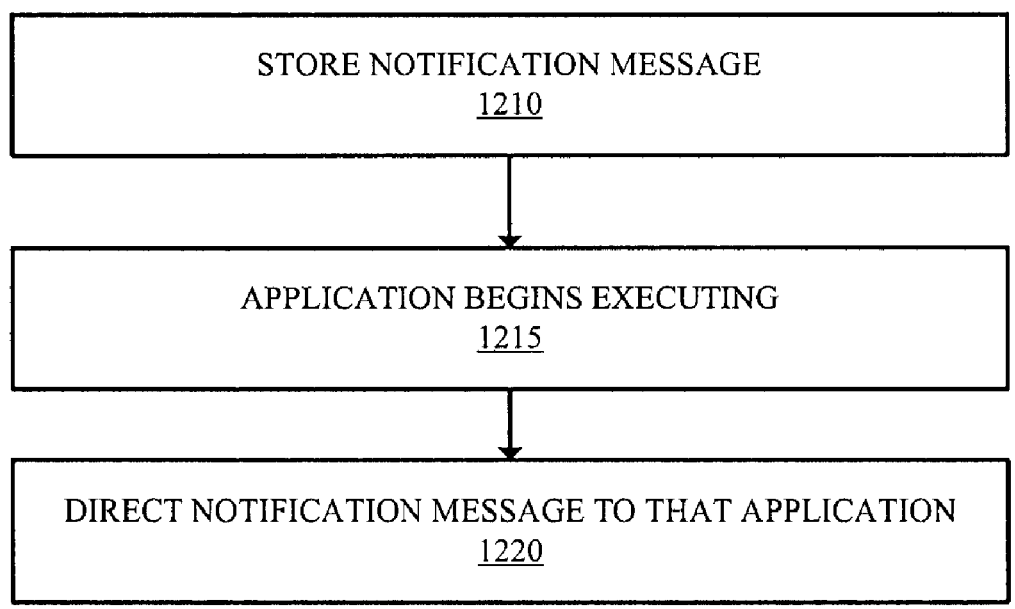
FIG. 12 is a flow diagram illustrating exemplary operations when an application associated with the notification message is not currently executing according to one embodiment of the invention.

If the application is not currently running, then flow moves to block 925 where the notification message manager 810 takes alternative action (e.g., the notification message manager 810 causes the application to execute, the notification message manager 810 causes the notification message to be stored in the notification message store 850 of the mobile device 160 without it being processed by its corresponding application until that application is executed, the notification message manager 810 drops the notification message, etc.). For example, FIG. 12 is a flow diagram illustrating exemplary operations when the application associated with the notification message is not currently executing. At block 1210, the notification message manager 810 causes the notification message to be stored in the notification message store 850. Flow moves from block 1210 to block 1215, where the application begins executing. Flow moves from block 1215 to block 1220, where the notification message is directed to the application for further processing.

With reference back to FIG. 9, at block 935, the application 840 which corresponds which received the redirected notification message, determines whether an icon badge is to be displayed on the graphical user interface 718. If an icon badge will be displayed, then flow moves to block 940 where the application 840 causes an appropriate icon badge to be displayed on the graphical user interface 718 for the application. In one embodiment, the application 840 uses the badging module 820 (e.g., a shared set of functions and data structures available to each of the application(s) 840) to cause the icon badge to be displayed on the graphical user interface 718. If an icon badge will not be displayed, then flow moves to block 945 where the application 840 continues processing the notification message. As used herein, displaying an icon badge includes creating an initial icon badge and/or updating an existing icon badge (e.g., incrementing a number of an existing icon badge).

Figure 10:
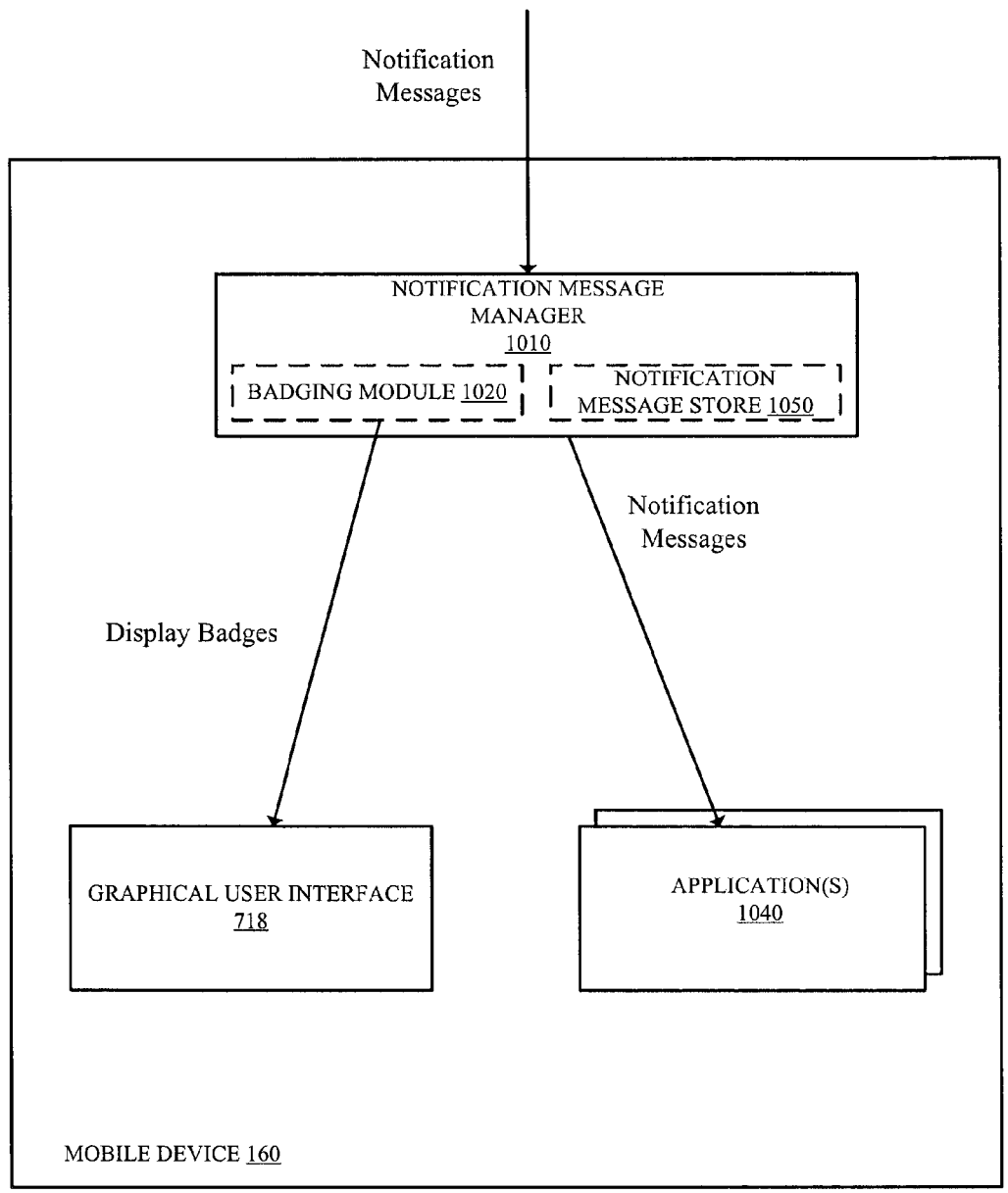
FIG. 10 is a block diagram that illustrates an alternative exemplary architecture of the mobile device to process notification messages according to one embodiment of the invention.

FIG. 10 is a block diagram that illustrates an alternative exemplary architecture of the mobile device 160 to process notification messages according to one embodiment of the invention. FIG. 10 will be described with reference to the exemplary operations illustrated in FIG. 11. However, it should be understood that the operations of FIG. 11 can be performed by embodiments of the invention other than those discussed with reference to FIG. 10, and the embodiments discussed with reference to FIG. 10 can perform operations different than those discussed with reference to FIG. 11. It should also be understood that the architecture illustrated in FIG. 10 is exemplary, and different architectures may be used in different embodiments.

As illustrated in FIG. 10, the mobile device 160 includes the notification message manager 1010, one or more applications 1040, and the graphical user interface 718. In one embodiment, the notification message manager 1010, the application(s) 1040, and the GUI 718 are each executed by the application processor 162 of the mobile device 160. The notification message manager 1010 receives notification messages from different notification services (e.g., the network connectivity element(s) 164 receive notification messages from the push notification services 110 and 120 and the pull notification service 130 and pass them to the notification message manager 1010 for processing). The notification message manager 1010 determines whether to display icon badges on the graphical user interface 130.

Figure 11:
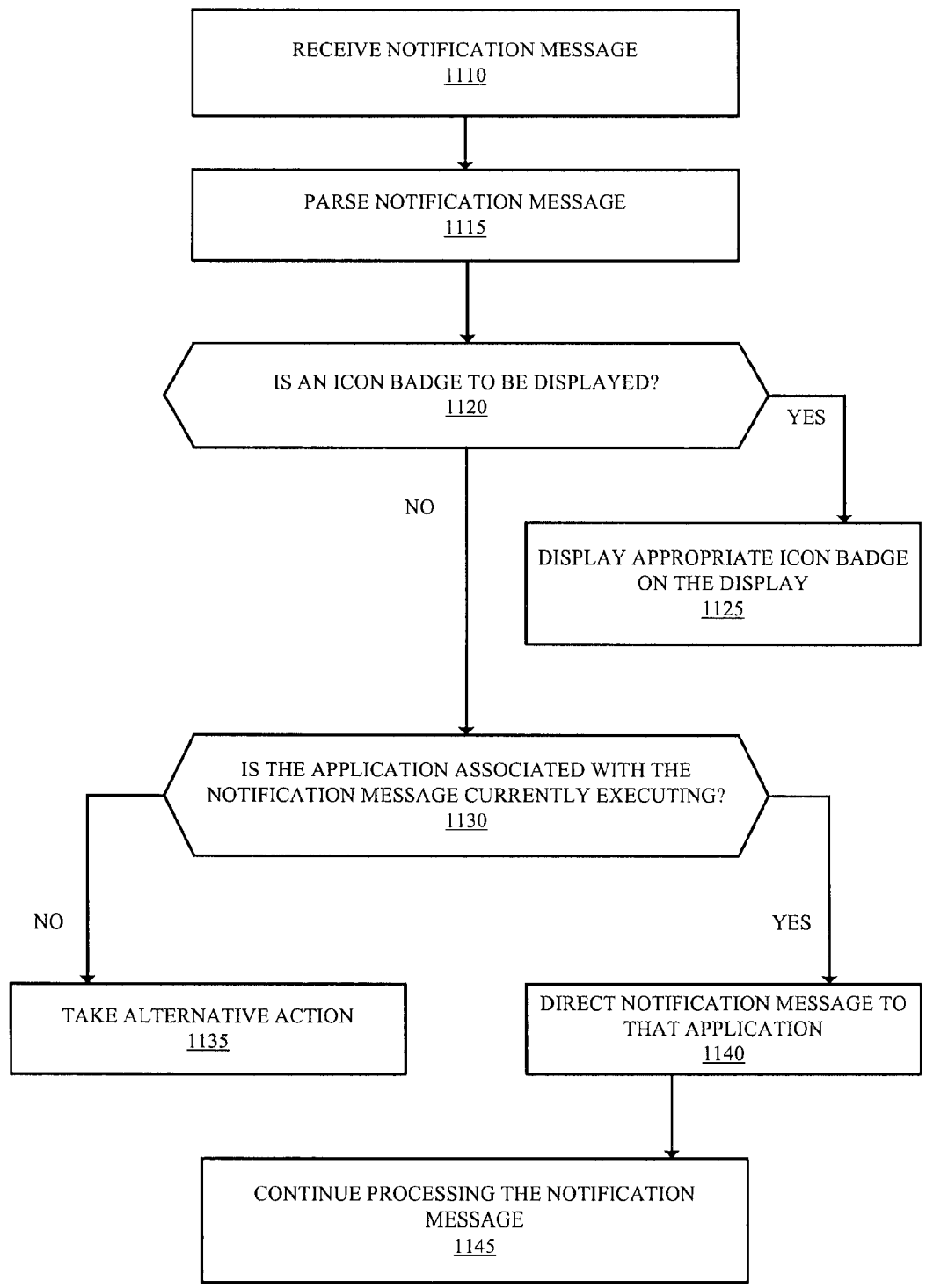
FIG. 11 is a flow diagram illustrating exemplary operations for processing notification messages according to one embodiment of the invention.

With reference to FIG. 11, at block 1110, the notification message manager 1010 receives a notification message. Flow moves from block 1110 to block 1115, where the notification message manager 1010 parses the received notification message. In one embodiment, the notification message manager 1010 parses the notification message to determine the application associated with the notification message and the type of notification message (e.g., whether an icon badge should be displayed according to the notification message, etc.).

Flow moves from block 1115 to block 1120, where the notification message manager 1010 determines whether an icon badge is to be displayed on the graphical user interface 1030 for the application. If an icon badge is to be displayed, then flow moves to block 1125 where the notification message manager 1010 causes an appropriate icon badge to be displayed on the graphical user interface 1030 of the mobile device 160. For example, in one embodiment of the invention, the notification message manager 1010 uses the badging module 1020 to cause the icon badge to be displayed on the graphical user interface 1030. If an icon badge is not going to be displayed (e.g., the type of notification message is not an icon badge), then flow moves to block 1130.

At block 1130, the notification message manager 1010 determines whether the application associated with the notification message is currently executing. If the application is not currently executing, then flow moves to block 1135 where alternative action is taken (e.g., the notification message is stored in the notification message store 1050 until the application is executed (e.g., as described in the operations of FIG. 12), the notification message is dropped, etc.). If the application is currently executing, then flow moves to block 1140 where the notification message manager 1010 directs the notification message to the appropriate one of the application(s) 1040 (e.g., as determined by the application identifier included in the notification message). Flow moves from block 1140 to block 1145, where that one of the application(s) 1040 continues processing the notification message.

In some embodiments, a user of the mobile device 160 may configure a setting to switch off/on icon badging for notification messages. In other embodiments, a user of the mobile device 160 may determine whether to receive icon badges notification messages for any of the applications that are installed on mobile device 160.

Figure 13:
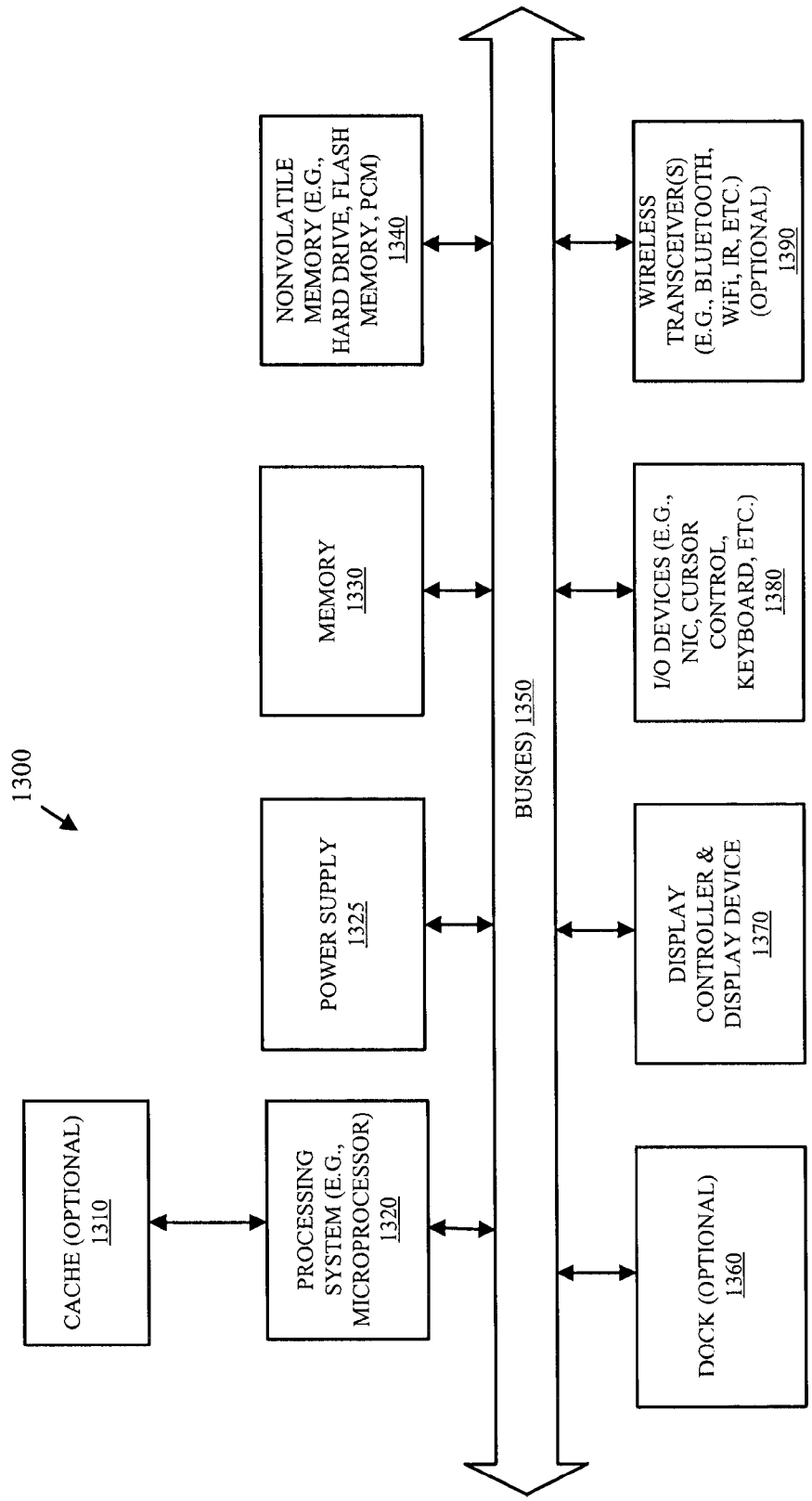
FIG. 13 is a block diagram illustrating an exemplary mobile device according to one embodiment of the invention.

FIG. 13 is a block diagram illustrating an exemplary computer system which may be used in some embodiments of the invention. For example, the exemplary architecture of the computer system 1300 may be included in the mobile device 160. It should be understood that while FIG. 13 illustrates various components of a computer system, it is not intended to represent any particular architecture or manner of interconnecting the components as such details are not germane to the present invention. It will be appreciated that other computer systems that have fewer components or more components may also be used with the present invention.

As illustrated in FIG. 13, the computer system 1300, which is a form of a data processing system, includes the bus(es) 1350 which is coupled with the processing system 1320, power supply 1325, memory 1330, and the nonvolatile memory 1340 (e.g., a hard drive, flash memory, Phase-Change Memory (PCM), etc.). The bus(es) 1350 may be connected to each other through various bridges, controllers, and/or adapters as is well known in the art. The processing system 1320 may retrieve instruction(s) from the memory 1330 and/or the nonvolatile memory 1340, and execute the instructions to perform operations as described above. The bus 1350 interconnects the above components together and also interconnects those components to the optional dock 1360, the display controller & display device 1370, Input/Output devices 1380 (e.g., NIC (Network Interface Card), a cursor control (e.g., mouse, touchscreen, touchpad, etc.), a keyboard, etc.), and the optional wireless transceiver(s) 1390 (e.g., Bluetooth, WiFi, Infrared, etc.).

Figure 14:
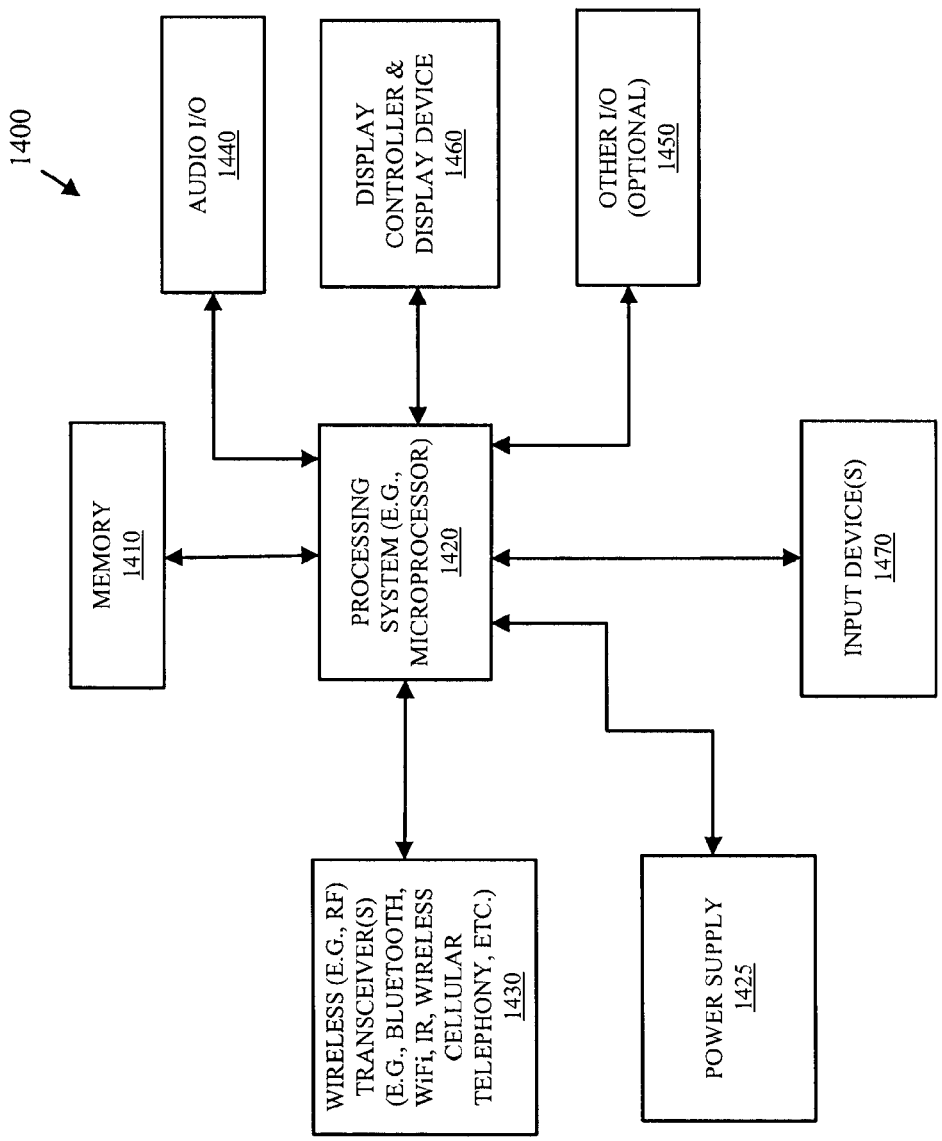
FIG. 14 is a block diagram illustrating an exemplary mobile device according to one embodiment of the invention.

FIG. 14 is a block diagram illustrating an exemplary data processing system which may be used in some embodiments of the invention. For example, the data processing system 1400 may be a handheld computer, a personal digital assistant (PDA), a mobile telephone, a portable gaming system, a portable media player, or a handheld computer which may include a mobile telephone, a media player, and/or a gaming system. As another example, the data processing system 1400 may be a network computer or an embedded processing device within another device.

According to one embodiment of the invention, the exemplary architecture of the data processing system 1400 may be included in the mobile device 160. The data processing system 1400 includes the processing system 1420, which may include one or more microprocessors and/or a system on an integrated circuit. The processing system 1420 is coupled with a memory 1410, a power supply 1425 (which includes one or more batteries) an audio input/output 1440, a display controller and display device 1460, optional input/output 1450, input device(s) 1470, and wireless transceiver(s) 1430. It will be appreciated that additional components, not shown in FIG. 14, may also be a part of the data processing system 1400 in certain embodiments of the invention, and in certain embodiments of the invention fewer components than shown in FIG. 14 may be used. In addition, it will be appreciated that one or more buses, not shown in FIG. 14, may be used to interconnect the various components as is well known in the art.

The memory 1410 may store data and/or programs for execution by the data processing system 1400. The audio input/output 1440 may include a microphone and/or a speaker to, for example, play music and/or provide telephony functionality through the speaker and microphone. The display controller and display device 1460 may include a graphical user interface (GUI). The wireless (e.g., RF) transceivers 1430 (e.g., a WiFi transceiver, an infrared transceiver, a Bluetooth transceiver, a wireless cellular telephony transceiver, etc.) may be used to communicate with other data processing systems. The one or more input devices 1470 allow a user to provide input to the system. These input devices may be a keypad, keyboard, touch panel, multi touch panel, etc. The optional other input/output 1450 may be a connector for a dock.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for managing a plurality of notification service connections, comprising:
   scheduling a notification service connection message transmission interval for each of the plurality of notification service connections;
   for each notification service connection message transmission interval, associating a notification service connection message transmission window with the notification service connection message transmission interval;
   setting and monitoring a notification service connection message transmission timer for each of the plurality of notification service connections;
   upon each notification service connection message transmission timer expiring, performing the following,
     transmitting a notification service connection message for each notification service connection whose notification service connection message transmission window overlaps the expiration of the notification service connection message transmission timer, and
     resetting the notification service connection message transmission timers associated with those notification service connections;
   receiving a notification message from a notification service on one of the plurality of notification service connections, wherein the notification message is for an application installed on the mobile device; and
   displaying an icon badge according to the notification message on a display of the mobile device for the application.

2. The method of claim 1, wherein the icon badge overlaps an icon corresponding with the application.

3. The method of claim 1, wherein the notification service corresponds to a push email service and the application is a push email application, and wherein the notification message alerts a user of the mobile device of new email, and wherein the icon badge indicates a number of unread email messages.

4. The method of claim 1, wherein the application is one of the following: a push email application, a weather application, a text message application, an instant message application, a social networking application, an application store application, and a news application.

5. The method of claim 1, wherein the application is not currently executing on the mobile device.

6. The method of claim 1, wherein at least one of the plurality of notification services connections is providing a push notification service, wherein transmitting a notification service connection message to those connections providing push notification services includes transmitting a ping message.

7. The method of claim 1, wherein at least one of the plurality of notification services connections is providing a pull notification service, wherein transmitting a notification service connection message to those connections providing pull notification services includes transmitting a polling message.

8. The method of claim 1, wherein at least some of the notification service connection message transmission intervals are a different value.

9. The method of claim 1, further comprising transmitting a notification service connection message for all notification service connections at a periodic interval, and resetting each notification service connection message transmission timer.

10. The method of claim 1, further comprising optimizing the notification service connection message transmission interval.

11. The method of claim 1, wherein the application is currently executing on the mobile device.

12. The method of claim 11, wherein the application causes the icon badge to be displayed.

13. The method of claim 1, further comprising:
   scheduling a mobile device wake in relation to each notification service connection message transmission timer; and
   prior to transmitting a notification service connection message, waking the mobile device if the mobile device is in sleep mode.

14. The method of claim 13, further comprising:
   if the mobile device is awake within a notification service connection message transmission window, transmitting a notification service connection message for that notification service connection and resetting the notification service connection message transmission timer associated with that notification service connection.

15. The method of claim 14, wherein sleep mode of the mobile device includes a temporarily disabled application processor, and waking the mobile device includes re-enabling the application processor.

16. A machine-readable storage medium that provides instructions that, if executed by a processor, will cause said processor to perform operations for managing a plurality of notification service connections, said operations comprising:
   scheduling a notification service connection message transmission interval for each of the plurality of notification service connections;
   for each notification service connection message transmission interval, associating a notification service connection message transmission window with the notification service connection message transmission interval;
   setting and monitoring a notification service connection message transmission timer for each of the plurality of notification service connections;
   upon each notification service connection message transmission timer expiring, performing the following,
     transmitting a notification service connection message for each notification service connection whose notification service connection message transmission window overlaps the expiration of the notification service connection message transmission timer, and
     resetting the notification service connection message transmission timers associated with those notification service connections;
   receiving a notification message from a notification service on one of the plurality of notification service connections, wherein the notification message is for an application installed on the mobile device; and
   displaying an icon badge according to the notification message on a display of the mobile device for the application.

17. The machine-readable storage medium of claim 16, wherein the icon badge overlaps an icon corresponding with the application.

18. The machine-readable storage medium of claim 16, wherein the notification service corresponds to a push email service and the application is a push email application, and wherein the notification message alerts a user of the mobile device of new email, and wherein the icon badge indicates a number of unread email messages.

19. The machine-readable storage medium of claim 16, wherein the application is one of the following: a push email application, a weather application, a text message application, an instant message application, a social networking application, an application store application, and a news application.

20. The machine-readable storage medium of claim 16, wherein the application is not currently executing on the mobile device.

21. The machine-readable storage medium of claim 16, wherein at least one of the plurality of notification services connections is providing a push notification service, wherein transmitting a notification service connection message to those connections providing push notification services includes transmitting a ping message.

22. The machine-readable storage medium of claim 16, wherein at least one of the plurality of notification services connections is providing a pull notification service, wherein transmitting a notification service connection message to those connections providing pull notification services includes transmitting a polling message.

23. The machine-readable storage medium of claim 16, wherein at least some of the notification service connection message transmission intervals are a different value.

24. The machine-readable storage medium of claim 16, further comprising transmitting a notification service connection message for all notification service connections at a periodic interval, and resetting each notification service connection message transmission timer.

25. The machine-readable storage medium of claim 16, further comprising optimizing the notification service connection message transmission interval.

26. The machine-readable storage medium of claim 16, wherein the application is currently executing on the mobile device.

27. The machine-readable storage medium of claim 26, wherein the application causes the icon badge to be displayed.

28. The machine-readable storage medium of claim 16, further comprising:
   scheduling a mobile device wake in relation to each notification service connection message transmission timer; and
   prior to transmitting a notification service connection message, waking the mobile device if the mobile device is in sleep mode.

29. The machine-readable storage medium of claim 28, further comprising:
   if the mobile device is awake within a notification service connection message transmission window, transmitting a notification service connection message for that notification service connection and resetting the notification service connection message transmission timer associated with that notification service connection.

30. The machine-readable storage medium of claim 29, wherein sleep mode of the mobile device includes a temporarily disabled application processor, and waking the mobile device includes re-enabling the application processor.

* * * * *